US010664237B2

(12) United States Patent
Anderson et al.

(10) Patent No.: US 10,664,237 B2
(45) Date of Patent: May 26, 2020

(54) APPARATUS AND METHOD FOR PROCESSING RECIPROCAL SQUARE ROOT OPERATIONS

(71) Applicant: Intel Corporation, Santa Clara, CA (US)

(72) Inventors: Cristina Anderson, Hillsboro, OR (US); Elmoustapha Ould-Ahmed-Vall, Chandler, AZ (US); Marius Cornea-Hasegan, Hillsboro, OR (US); Robert Valentine, Kiryat Tivon (IL); Mark Charney, Lexington, MA (US); Jesus Corbal, King City, OR (US); Venkateswara Madduri, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 15/850,673

(22) Filed: Dec. 21, 2017

(65) Prior Publication Data

US 2019/0196790 A1 Jun. 27, 2019

(51) Int. Cl.
*G06F 7/552* (2006.01)
*G06F 1/03* (2006.01)
*G06F 9/30* (2018.01)

(52) U.S. Cl.
CPC ............ *G06F 7/5525* (2013.01); *G06F 1/03* (2013.01); *G06F 9/30101* (2013.01); *G06F 9/30145* (2013.01); *G06F 2207/5521* (2013.01)

(58) Field of Classification Search
CPC .......... G06F 1/03–1/0307; G06F 7/552–5525; G06F 2207/5521

(Continued)

(56) References Cited

U.S. PATENT DOCUMENTS 5,973,705 A 10/1999 Narayanaswami
6,163,791 A * 12/2000 Schmookler ............ G06F 7/535
  708/502

(Continued)

OTHER PUBLICATIONS

M. M. Özbilen and M. Gök, "A single/double precision floating-point reciprocal unit design for multimedia applications," 2009 International Conference on Electrical and Electronics Engineering—ELECO 2009, pp. II-352-II-356, 2009 (Year: 2009).*

(Continued)

*Primary Examiner* — Matthew D Sandifer
(74) *Attorney, Agent, or Firm* — Nicholson De Vos Webster & Elliott LLP

(57) ABSTRACT

An apparatus and method for performing a reciprocal square root. For example one embodiment of a processor comprises: a decoder to decode a reciprocal square root instruction to generate a decoded reciprocal square root instruction; a source register to store at least one packed input data element; a destination register to store a result data element; and reciprocal square root execution circuitry to execute the decoded reciprocal square root instruction, the reciprocal square root execution circuitry to use a first portion of the packed input data element as an index to a data structure containing a plurality of sets of coefficients to identify a first set of coefficients from the plurality of sets, the reciprocal square root execution circuitry to generate a reciprocal square root of the packed input data element using a combination of the coefficients and a second portion of the packed input data element.

30 Claims, 19 Drawing Sheets

(58) Field of Classification Search
USPC .................................................. 708/272, 277
See application file for complete search history.

(56) References Cited

U.S. PATENT DOCUMENTS

| | | | | |
|---|---|---|---|---|
| 6,385,713 | B2 * | 5/2002 | Yung | G06F 7/5443 708/500 |
| 8,990,278 | B1 * | 3/2015 | Clegg | G06F 7/544 708/272 |
| 9,639,355 | B2 | 5/2017 | Pineiro et al. | |
| 2003/0037080 | A1 * | 2/2003 | Clifton | G06F 1/0356 708/270 |
| 2005/0027772 | A1 * | 2/2005 | Enenkel | G06F 7/5525 708/502 |
| 2006/0271615 | A1 * | 11/2006 | Shearer | G06F 7/483 708/502 |
| 2012/0226730 | A1 | 9/2012 | Fit-Florea | |
| 2017/0083287 | A1 * | 3/2017 | Yu | G06F 7/548 |
| 2018/0150295 | A1 | 5/2018 | Zhang et al. | |

OTHER PUBLICATIONS

Non-Final Office Action, U.S. Appl. No. 15/850,636, dated Oct. 18, 2019, 15 pages.

* cited by examiner

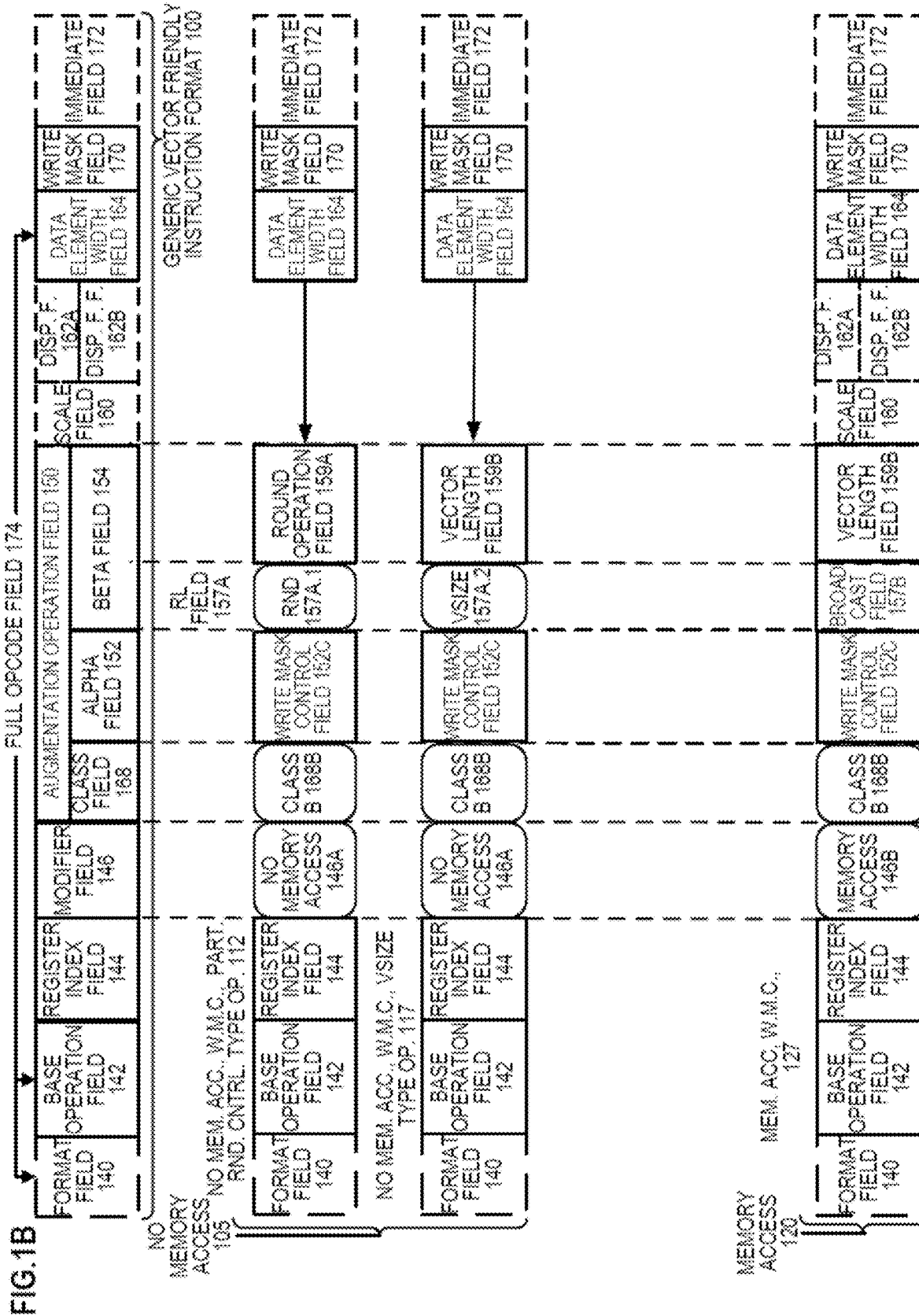

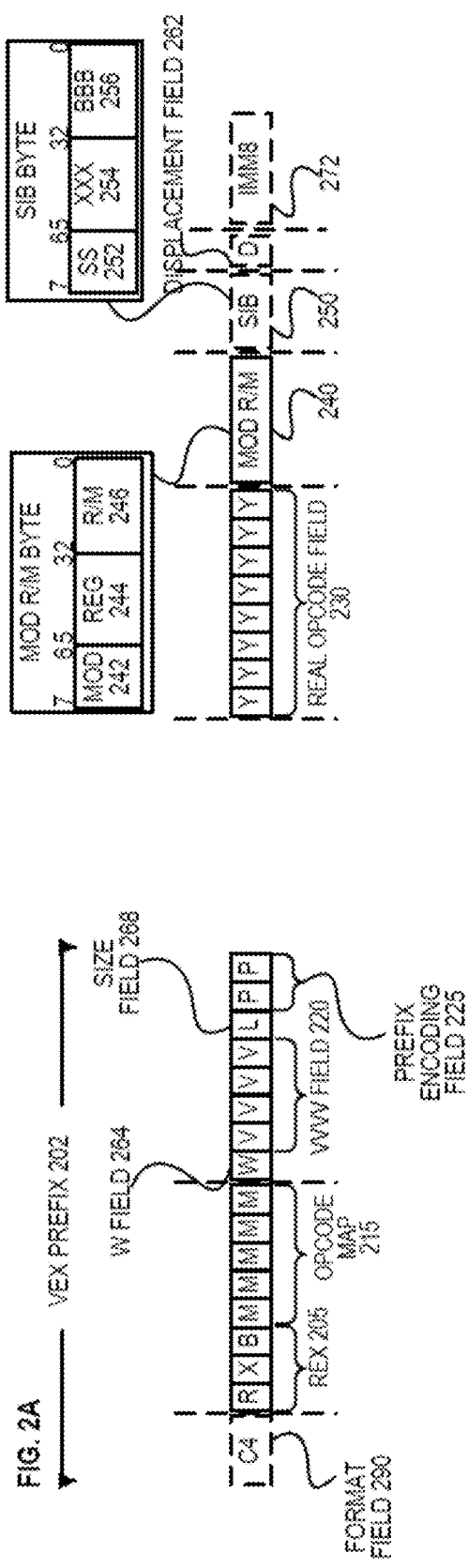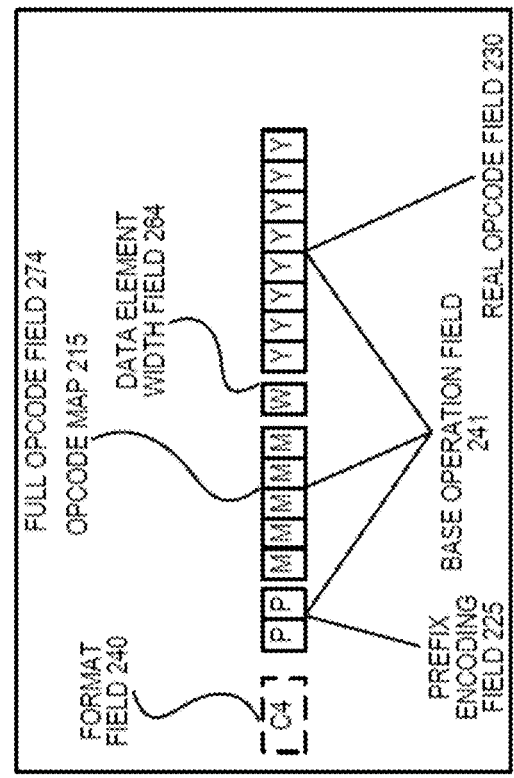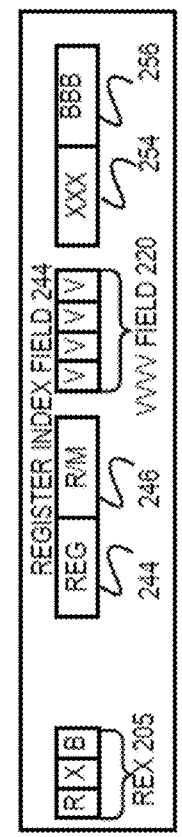

FIG. 3
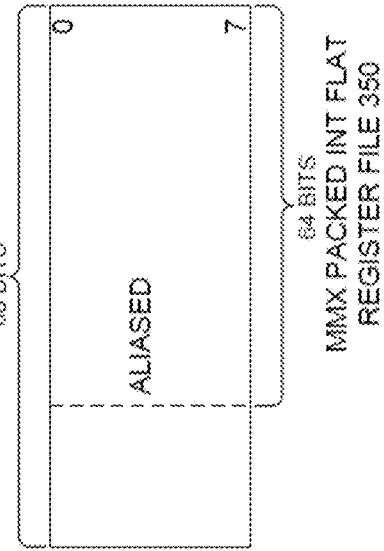
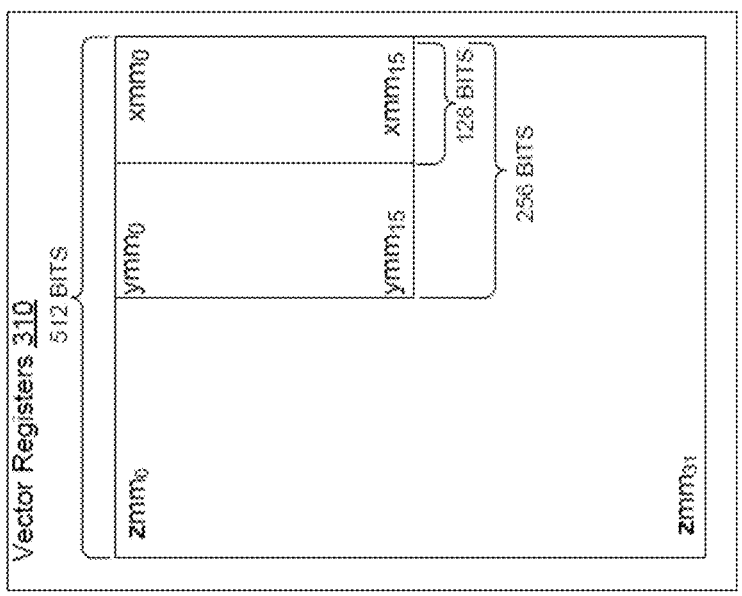

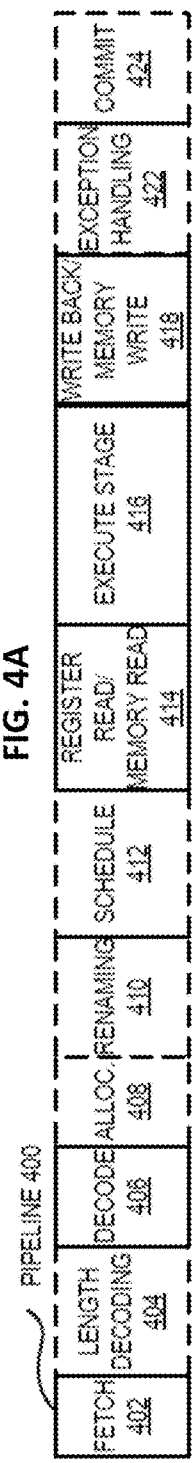
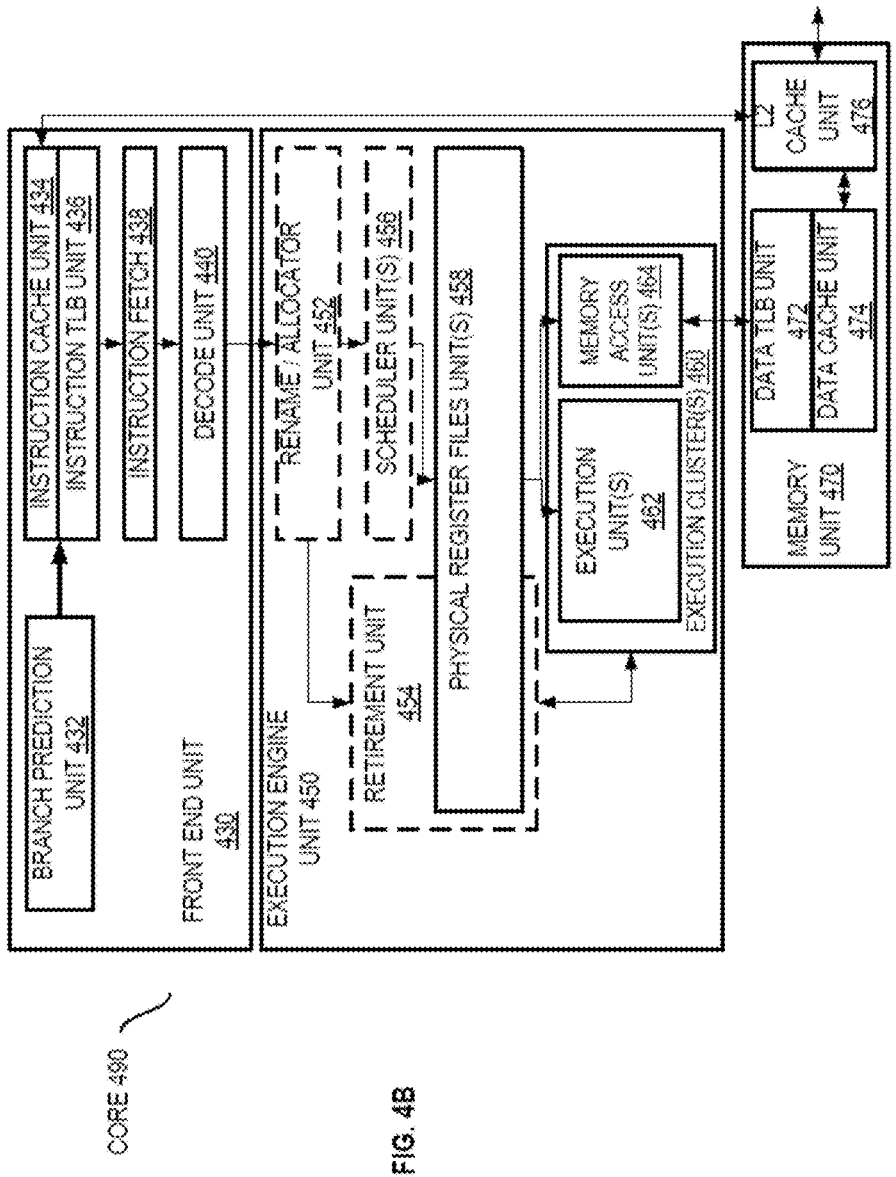

Fig. 13

APPARATUS AND METHOD FOR PROCESSING RECIPROCAL SQUARE ROOT OPERATIONS

BACKGROUND

Field of the Invention

The embodiments of the invention relate generally to the field of computer processors. More particularly, the embodiments relate to an apparatus and method for processing fractional reciprocal and reciprocal square root operations.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

Multiply-accumulate is a common digital signal processing operation which computes the product of two numbers and adds that product to an accumulated value. Existing single instruction multiple data (SIMD) microarchitectures implement multiply-accumulate operations by executing a sequence of instructions. For example, a multiply-accumulate may be performed with a multiply instruction, followed by a 4-way addition, and then an accumulation with the destination quadword data to generate two 64-bit saturated results.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention; and FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

FIG. 13 illustrates a plurality of packed data elements containing real and complex values in accordance with one embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1A:
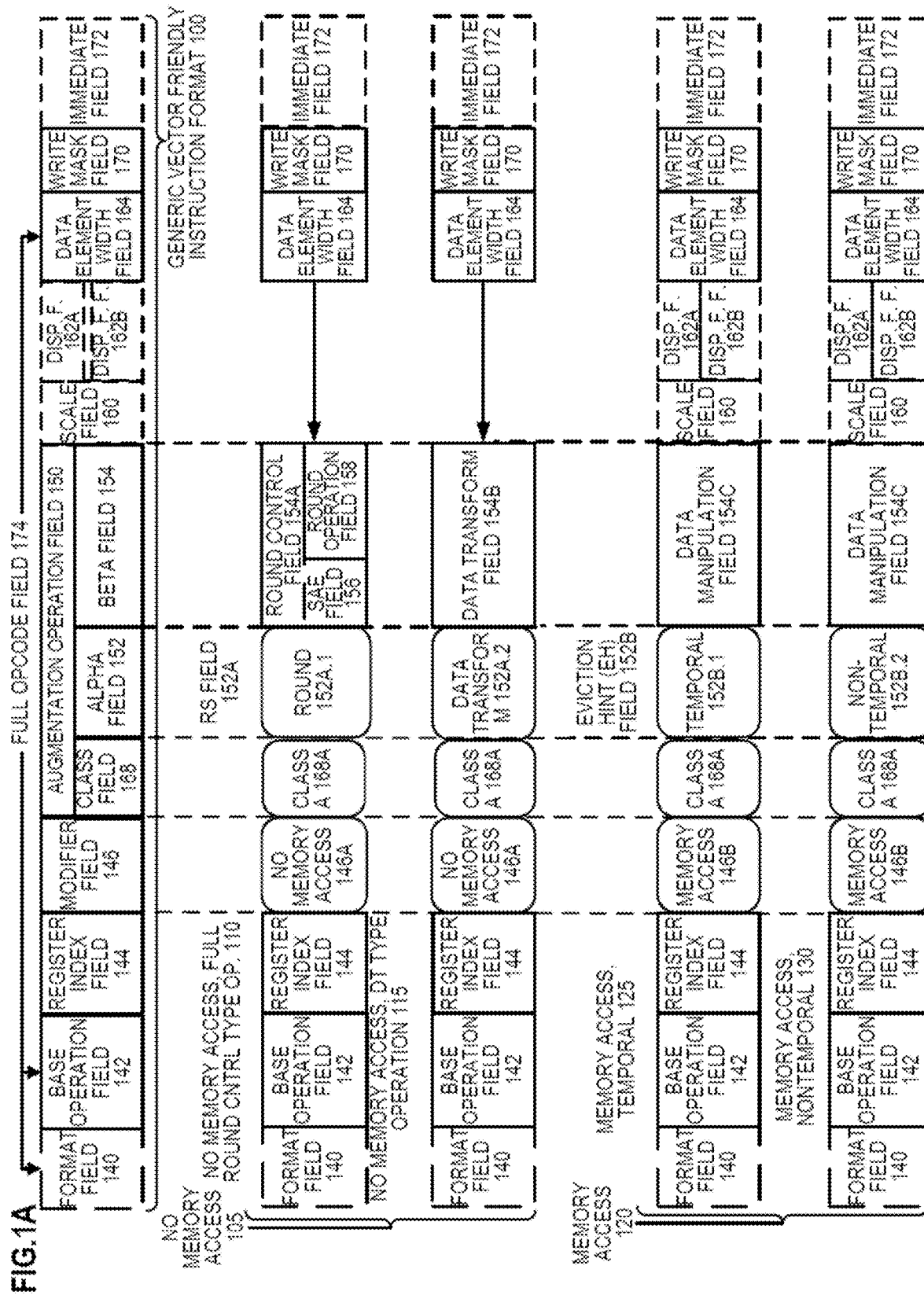

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*$index+base).

Displacement Field 162A—its content is used as part of memory address generation (e.g., for address generation that uses $2^{scale}*$index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit [5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
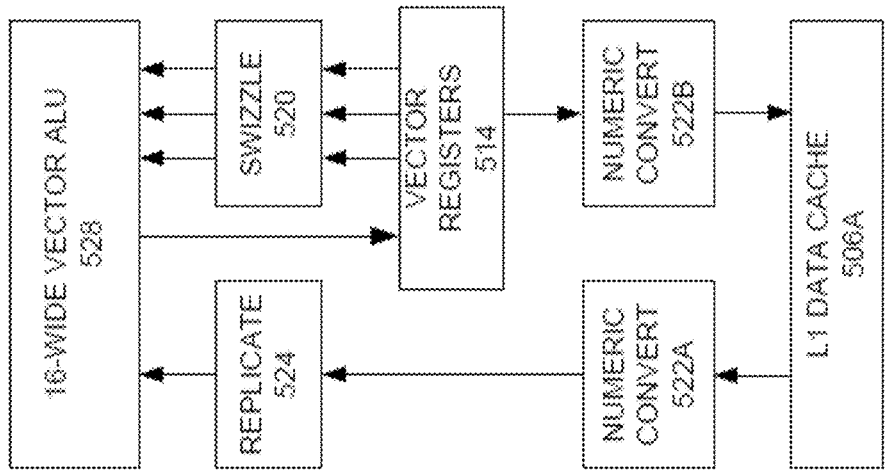
FIG. 5B illustrates an expanded view of part of the processor core in FIG. 5A according to embodiments of the invention.
Figure 5A:
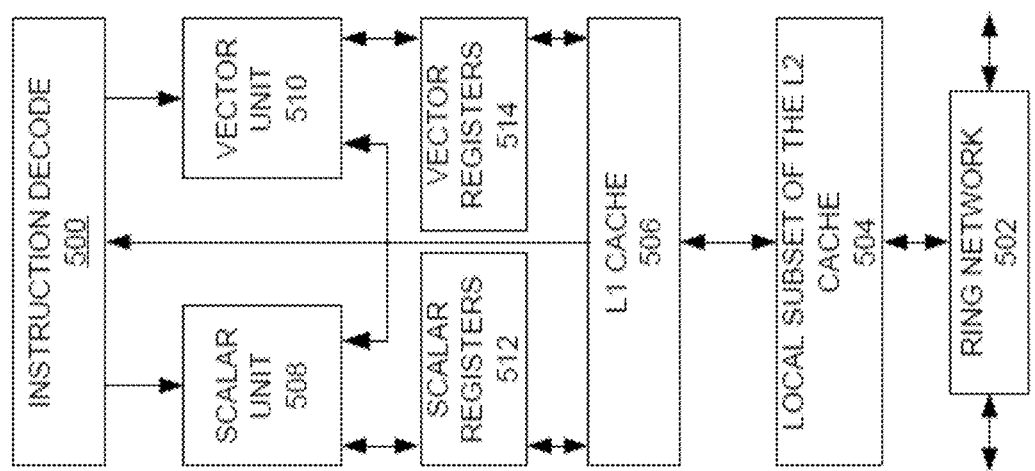
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
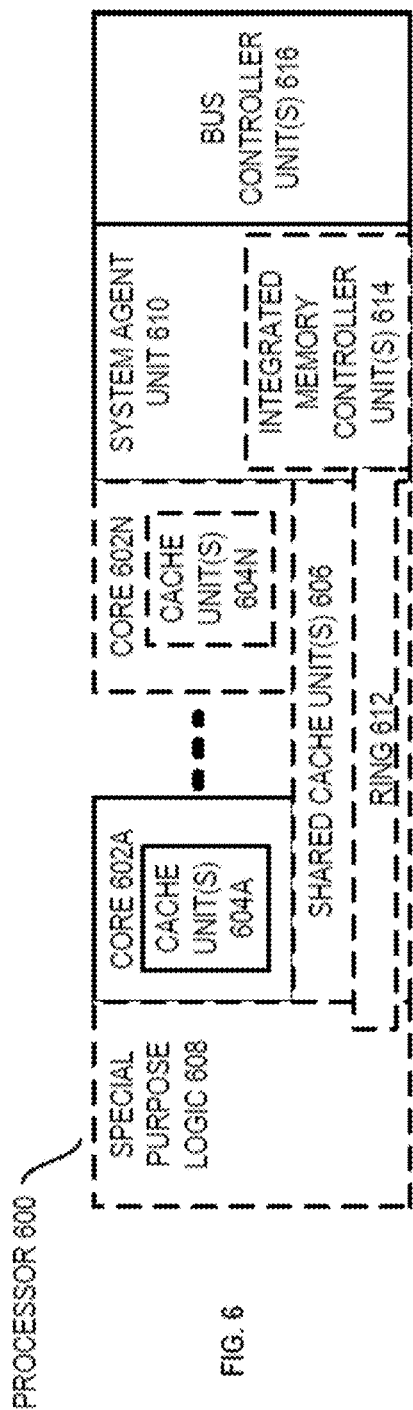
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
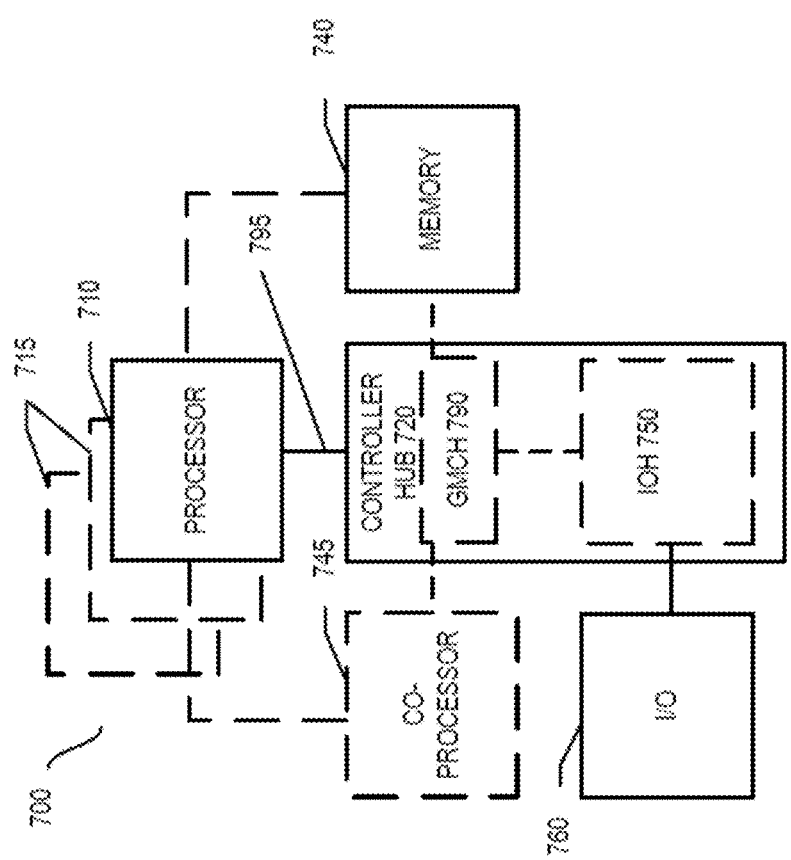
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
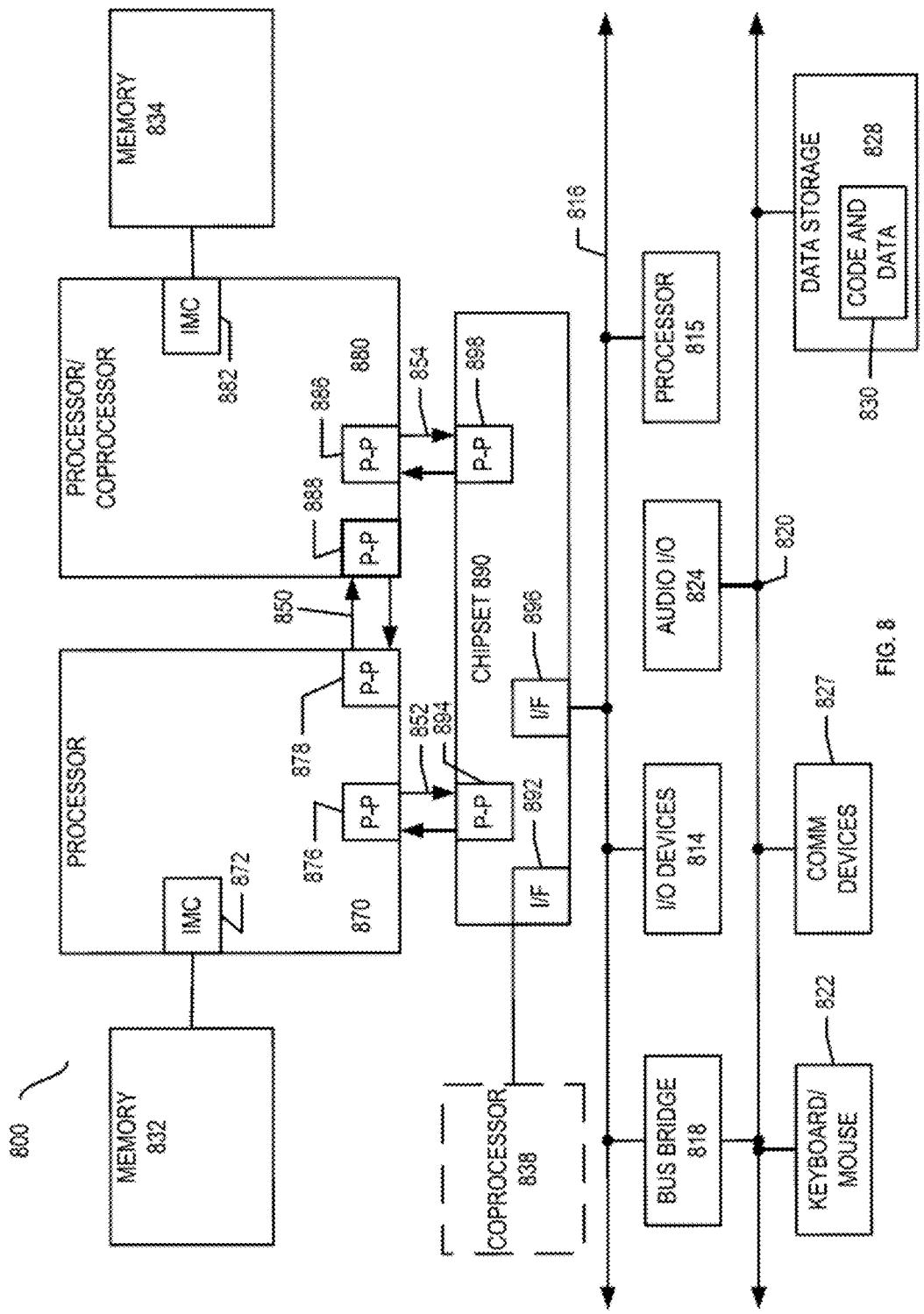
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
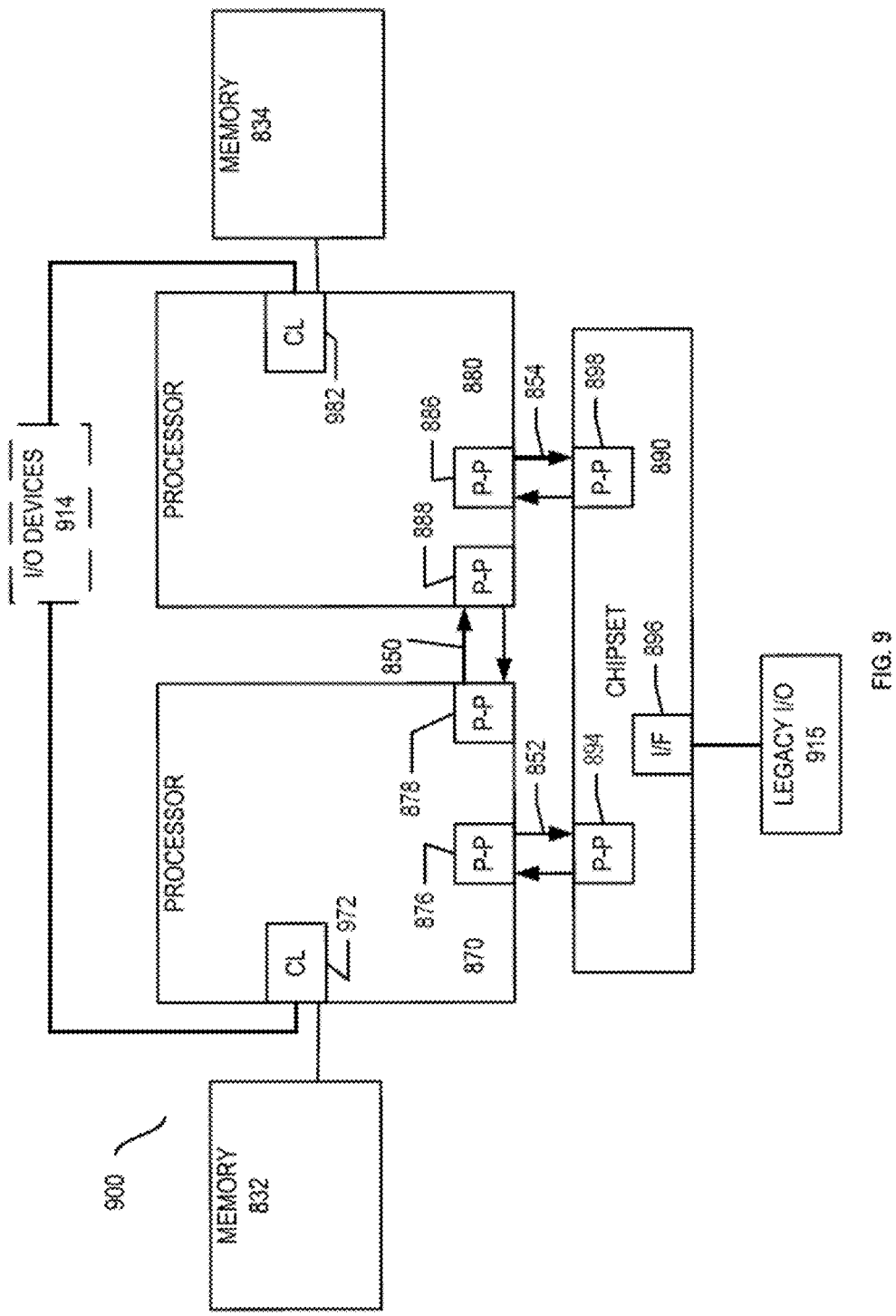
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
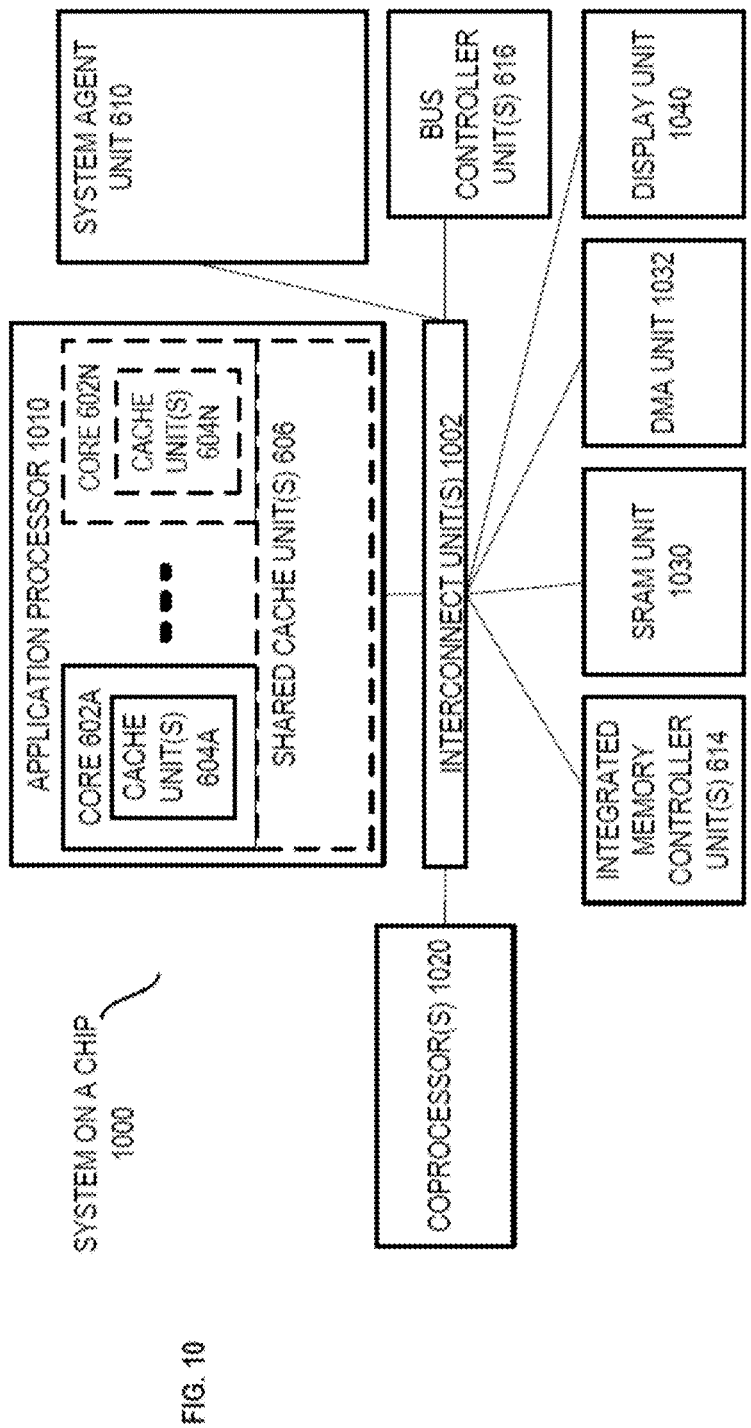
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
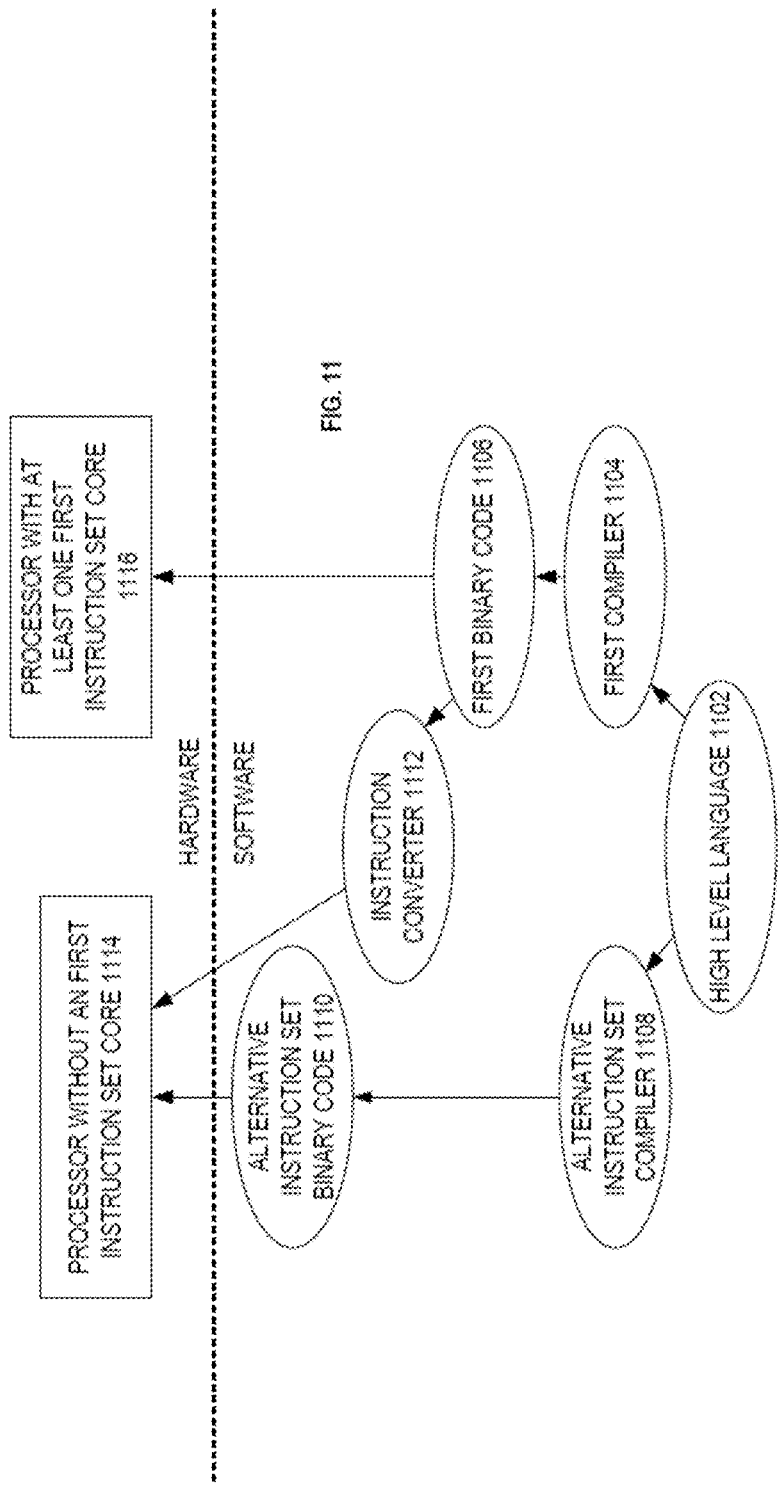
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Exemplary Digital Signal Processing Architectures

One embodiment of the invention includes circuitry and/or logic for processing digital signal processing (DSP) instructions. In particular, one embodiment comprises a multiply-accumulate (MAC) architecture with eight 16×16-bit multipliers and two 64-bit accumulators. The instruction set architecture (ISA) described below can process various multiply and MAC operations on 128-bit packed (8-bit, 16-bit or 32-bit data elements) integer, fixed point and complex data types. In addition, certain instructions have direct support for highly efficient Fast Fourier Transform (FFT) and Finite Impulse Response (FIR) filtering, and post-processing of accumulated data by shift, round, and saturate operations.

One embodiment of the new DSP instructions use a VEX.128 prefix based opcode encoding and several of the SSE/SSE2/AVX instructions that handle post-processing of data are used with the DSP ISA. The VEX-encoded 128-bit DSP instructions with memory operands may have relaxed memory alignment requirements.

In one embodiment, the instructions also support a variety of integer and fixed point data types including:
1) a Q31 data type for signals requiring analog to digital conversion (ADC) and digital to analog conversion (DAC) with greater than 16 bits;
2) a Q15 data type which is common in DSP algorithms;
3) a complex 16-bit data type; and
4) a complex 32-bit data type.

The instruction set architecture described herein targets a wide range of standard DSP (e.g., FFT, filtering, pattern matching, correlation, polynomial evaluation, etc) and statistical operations (e.g., mean, moving average, variance, etc.).

Target applications of the embodiments of the invention include sensor, audio, classification tasks for computer vision, and speech recognition. The DSP ISA described herein includes a wide range of instructions that are applicable to deep neural networks (DNN), automatic speech recognition (ASR), sensor fusion with Kalman filtering, other major DSP applications, etc. Given the sequence of weights $\{w_1, w_2, \ldots w_k\}$ and the input sequence $\{x_1, x_2, x_3, \ldots x_n\}$ many image processing, machine learning tasks require to compute the result sequence $\{y_1, y_2, y_3, \ldots y_{n+1-k}\}$ defined by $y_i = w_1 x_i + w_2 x_{i+1} + \ldots + w_k x_{i+k-1}$.

Figure 12:
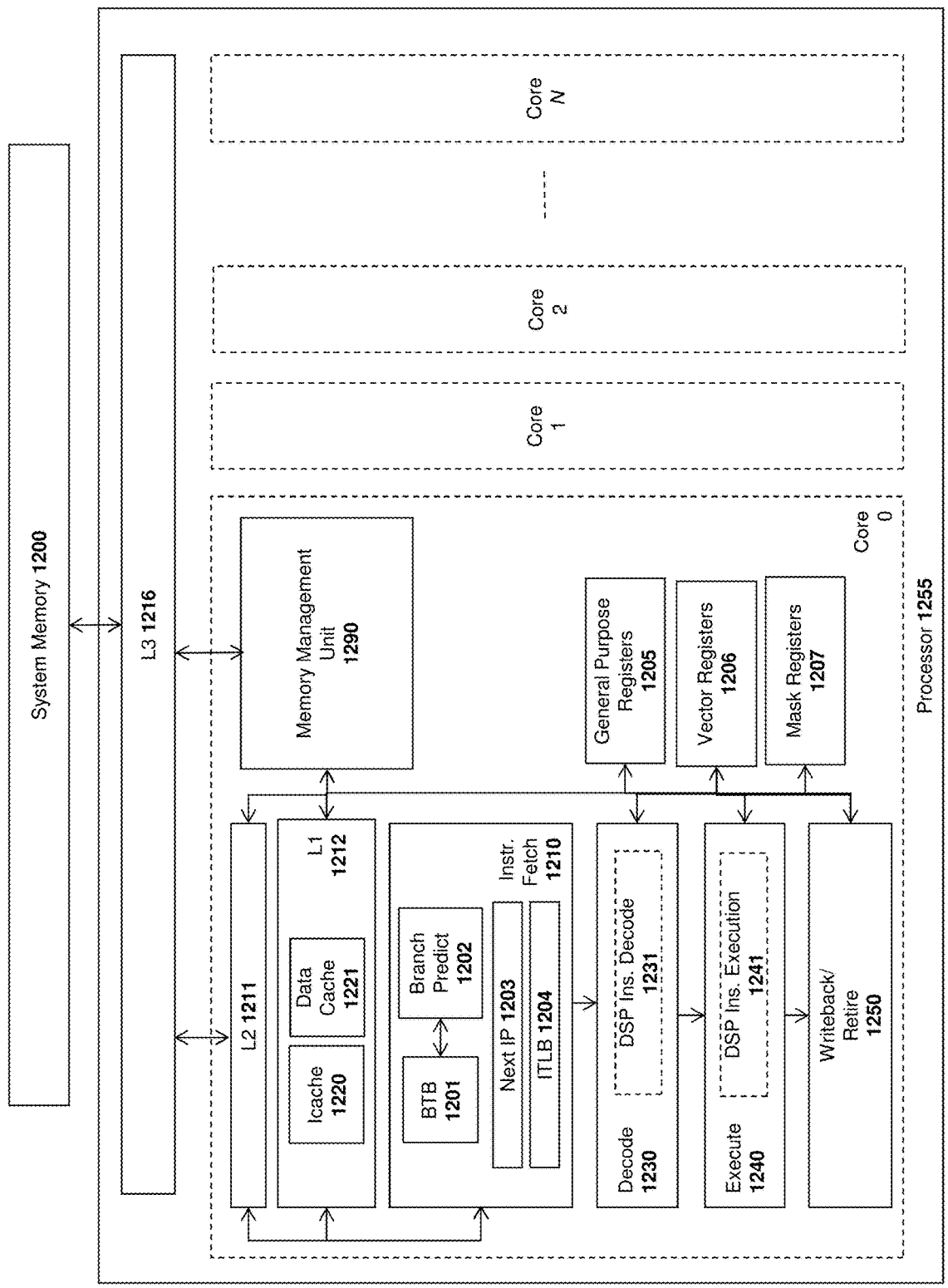
FIG. 12 illustrates a processor architecture on which embodiments of the invention may be implemented.

FIG. 12 illustrates an exemplary processor 1255 on which embodiments of the invention may be implemented which includes a plurality of cores 0-N for simultaneously executing a plurality of instruction threads. The illustrated embodiment includes DSP instruction decode circuitry/logic 1231 within the decoder 1230 and DSP instruction execution circuitry/logic 1341 within the execution unit 1240. These pipeline components may perform the operations described herein responsive to the decoding and execution of the DSP instructions. While details of only a single core (Core 0) are shown in FIG. 12, it will be understood that each of the other cores of processor 1255 may include similar components.

Prior to describing specific details of the embodiments of the invention, a description of the various components of the exemplary processor 1255 are provided directly below. The plurality of cores 0-N may each include a memory management unit 1290 for performing memory operations (e.g., such as load/store operations), a set of general purpose registers (GPRs) 1205, a set of vector registers 1206, and a set of mask registers 1207. In one embodiment, multiple vector data elements are packed into each vector register 1206 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1207 include eight 64-bit operand mask registers used for performing bit masking operations on the values stored in the vector registers 1206 (e.g., implemented as mask registers k0-k7 described herein). However, the underlying principles of the invention are not limited to any particular mask register size/type.

Each core 0-N may include a dedicated Level 1 (L1) cache 1212 and Level 2 (L2) cache 1211 for caching instructions and data according to a specified cache management policy. The L1 cache 1212 includes a separate instruction cache 1220 for storing instructions and a separate data cache 1221 for storing data. The instructions and data stored within the various processor caches are managed at the granularity of cache lines which may be a fixed size (e.g., 64, 128, 512 Bytes in length). Each core of this exemplary embodiment has an instruction fetch unit 1210 for fetching instructions from main memory 1200 and/or a shared Level 3 (L3) cache 1216. The instruction fetch unit 1210 includes various well known components including a next instruction pointer 1203 for storing the address of the next instruction to be fetched from memory 1200 (or one of the caches); an instruction translation look-aside buffer (ITLB) 1204 for storing a map of recently used virtual-to-physical instruction addresses to improve the speed of address translation; a branch prediction unit 1202 for speculatively predicting instruction branch addresses; and branch target buffers (BTBs) 1201 for storing branch addresses and target addresses.

As mentioned, a decode unit 1230 includes DSP instruction decode circuitry/logic 1231 for decoding the DSP instructions described herein into micro-operatons or "uops" and the execution unit 1240 includes DSP instruction execution circuitry/logic 1241 for executing the DSP instructions. A writeback/retirement unit 1250 retires the executed instructions and writes back the results.

One embodiment of the first instruction is represented as VPRCPUFW xmm1, xmm2/m128, where xmm2/m128 is a source register or memory location storing an input word value of which a reciprocal is to be calculated and xmm1 is a destination register to store the reciprocal result. A second instruction, represented as VPRCPUFD xmm1, xmm2/m128, takes the reciprocal of a doubleword value stored in xmm2/m128 and stores the reciprocal in xmm1.

Figure 13:
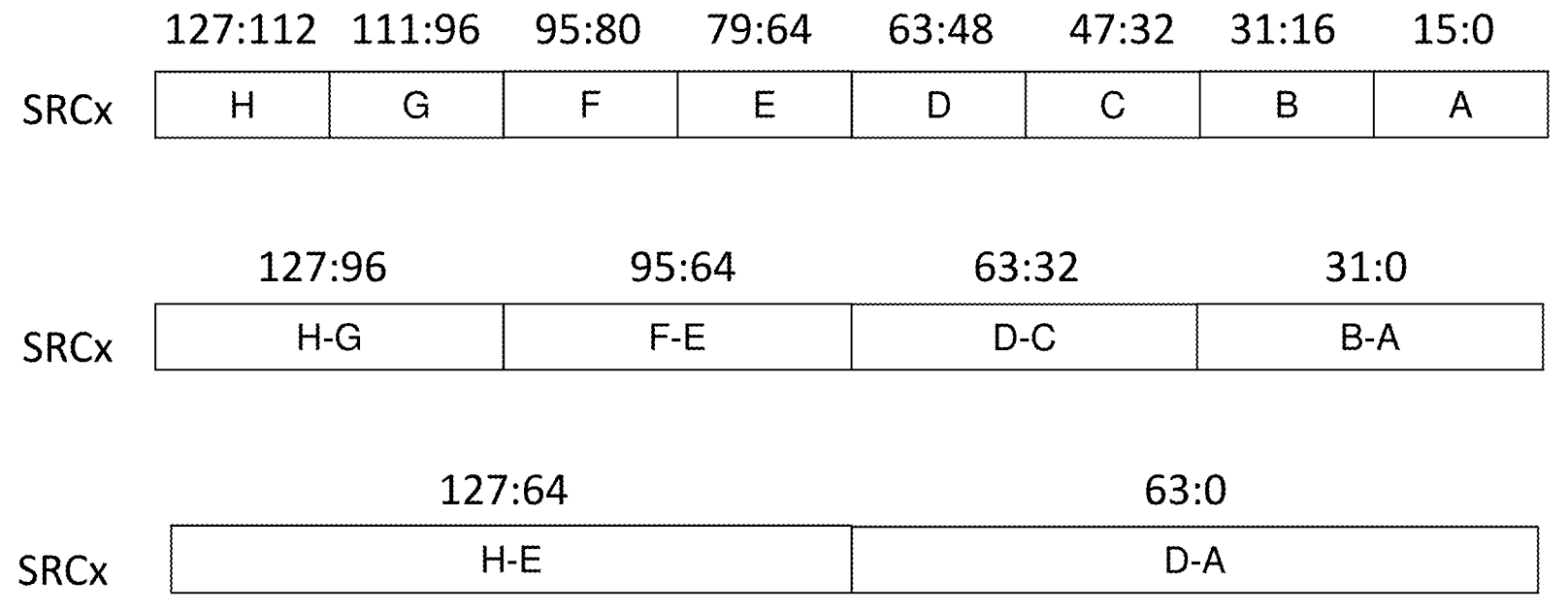

FIG. 13 illustrates exemplary data element and bit distributions for an exemplary source register and/or destination register (SRCx/dDESTx). Data elements may be packed into the source register and/or destination register in words (16 bits), doublewords (32 bits), and/or quadwords (64 bits) as illustrated. In some embodiments which process complex numbers, the real and imaginary components may be stored in adjacent data element locations. For example, a real component may be stored as data element A and the corresponding imaginary component may be stored as data element B. However, in some of the embodiments described herein, including the reciprocal instructions and reciprocal square root instructions, the packed data elements do not represent complex numbers. Rather, in these embodiments, the packed data elements are real words and doublewords.

Figure 14:
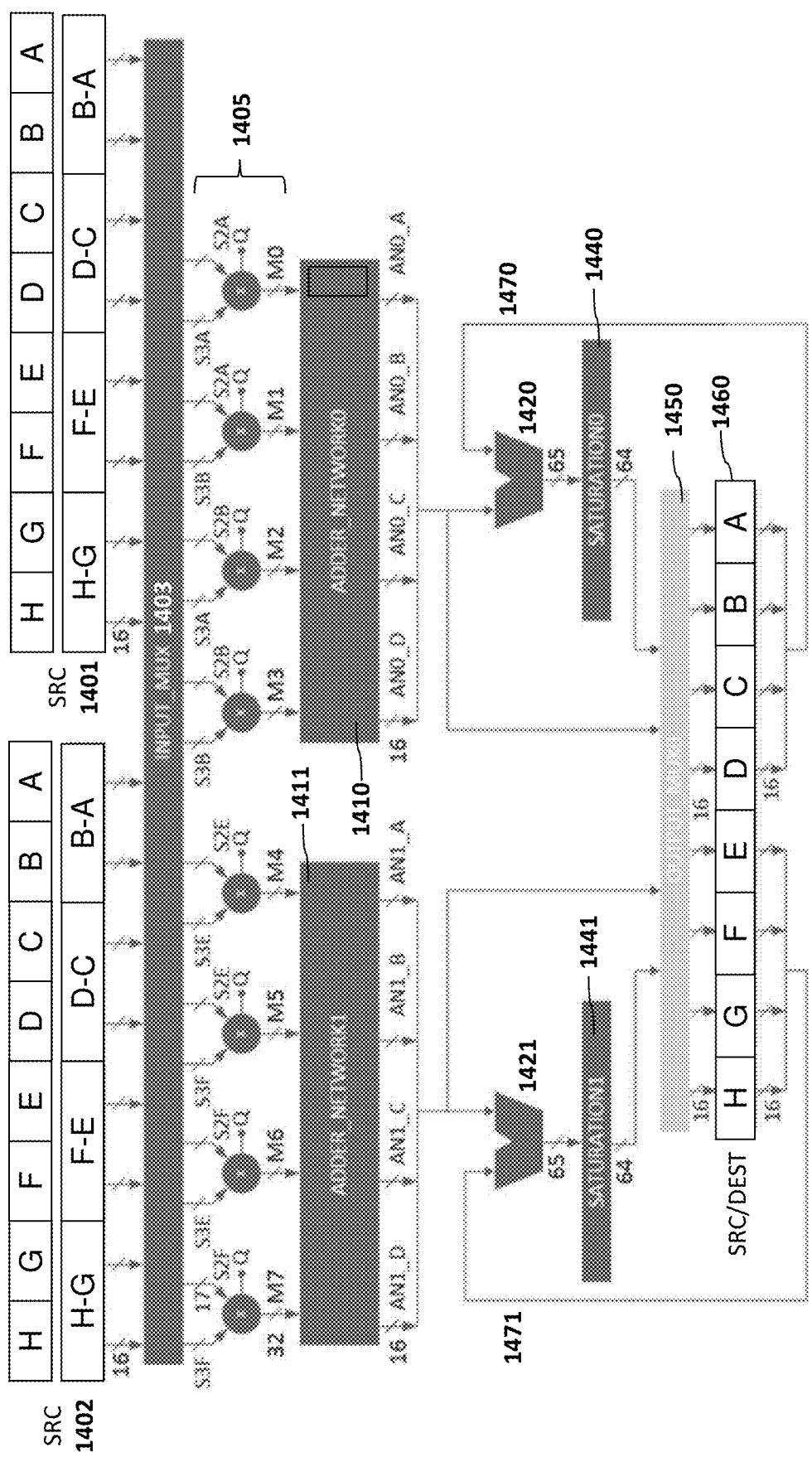
FIG. 14 illustrates one embodiment of an architecture on which fractional reciprocal and reciprocal square root instructions may be implemented.

FIG. 14 illustrates an exemplary architecture for executing various different DSP instructions, including at least some of the operations required by the fractional reciprocal and reciprocal square root instructions. The general operation of this architecture will first be described followed by a detailed description of the reciprocal instructions. When executing a DSP instruction, one or more packed word, doubleword or quadword values are stored in registers SRC 1401 and/or SRC 1402. A set of multipliers 1405 multiply selected packed data elements in SRC 1401 with selected packed data elements in SRC2. Different data element sizes and different combinations of packed data elements may be selected for multiplications based on the particular DSP instruction being executed. Adder networks 1410-1411 may then add/subtract the resulting products of the multiplications in different combinations in accordance with the instruction.

Depending on the instruction, accumulators 1420-1421 may combine selected results generated by the multipliers 1405 and/or adder networks 1410-1411 with accumulated results in the SRC/DEST register 1440. Saturation units 1440-1441 generate saturated data elements from the accumulated results (again, depending on the instruction), and output mux 1450 forwards the final results to the SRC/DEST register 1460.

Various other operations may be performed depending on the instruction such as shifting, extracting, loading, storing, permuting, zero-extending, sign extending, and rounding, to name a few. In addition, products generated by the multipliers 1405 and results generated by adder networks 1410-1411 may be stored in temporary registers or memory locations which are not illustrated. Some of these temporary storage locations are referred to below using ftmp[n] designations where n is a whole number identifying a particular temporary storage location.

In one embodiment, the following functions operate on unsigned words and doublewords are used in fixed-point DSP algorithms:

y=1/x (fractional reciprocal); and
y=1/sqrt(x) (reciprocal square root).

Embodiments of the fractional reciprocal instruction are described first in Section A below. Embodiments of the reciprocal square root are then described in Section B.

A. Embodiments for Performing Fractional Reciprocal Operations on Packed Data Elements One embodiment of the invention includes a first instruction for determining a reciprocal of an unsigned word and a second instruction for determining a reciprocal of an unsigned doubleword. The word values may be stored as packed 16-bit data elements and the doubleword values may be stored as packed 32-bit data elements within the source and destination registers described herein.

Given the input value x, one embodiment of the invention computes y=1/x. A first instruction may be executed for a doubleword value of x (e.g., VPRCPUFD) and a second instruction may be executed for a word value of x (e.g., VPRCPUFW). The doubleword implementation will be described first followed by the word implementation.

1. Exemplary Doubleword Reciprocal Operations

In one embodiment, the input x is a doubleword having an unsigned Q0.32 format. The Q designates a fixed point number format where the number of fractional bits and potentially the number of integer bits is specified. For example, a Q1.14 number has 1 integer bit and 14 fractional bits. In the instant application, the Q0.32 number format for x has 32 fractional bits and is thus scaled by $2^{32}$. In one embodiment, the range of x is set to between 0.5 and 1 (i.e., [0.5, 1]) or [0x80000000, 0xFFFFFFFF]). In addition, in one embodiment, the result y is an unsigned Q1.31 number and is thus scaled by $2^{31}$. The allowable range of y in one embodiment is between 1 and 2 (i.e., [1,2] or [0x80000000, 0xFFFFFFFF]). In one implementation, the maximum absolute error for the reciprocal operation is 1.09 ulp and the reciprocal is estimated to almost 16 bits using a degree 3 polynomial.

Figure 15:
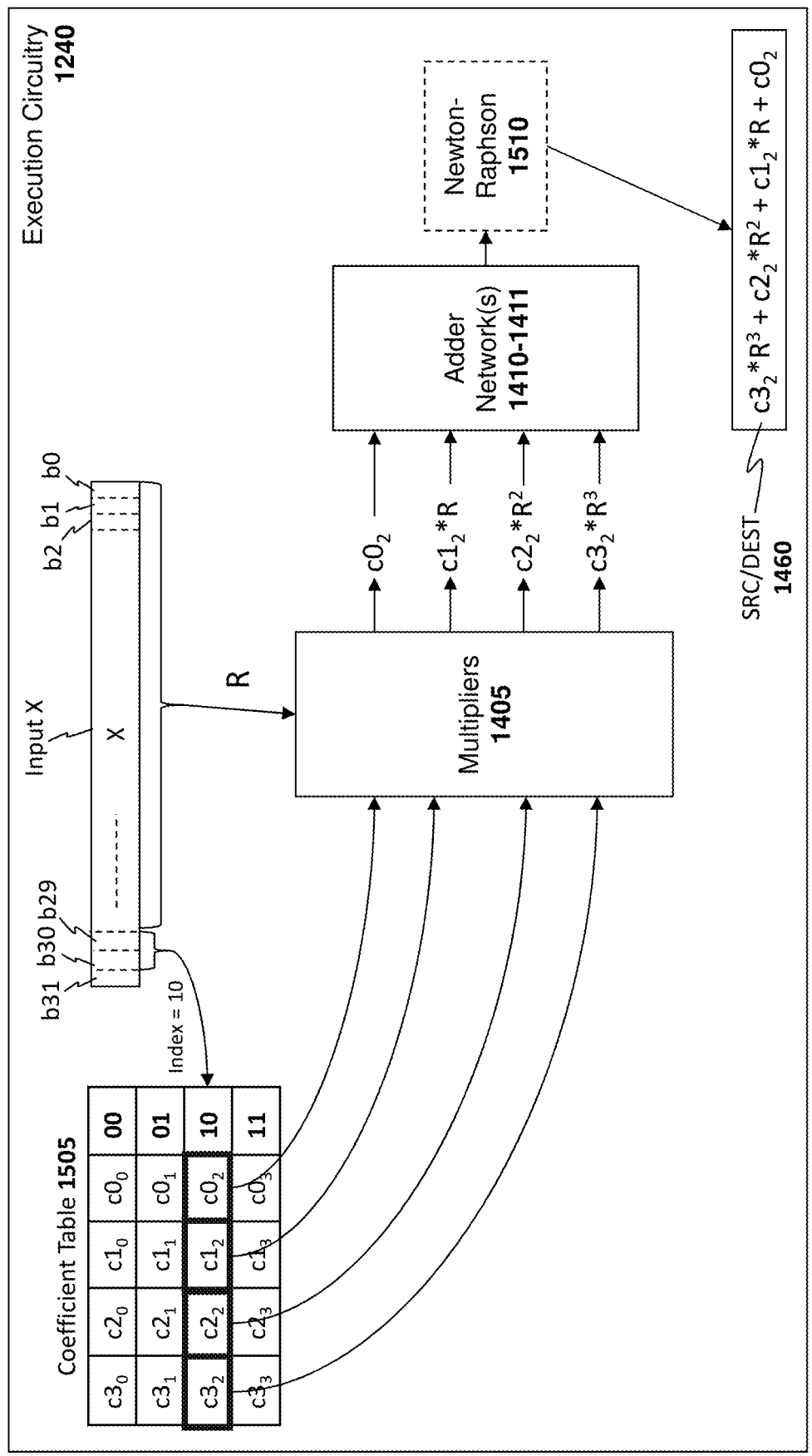
FIG. 15 illustrates one example of an embodiment for processing fractional reciprocal instructions.

FIG. 15 illustrates exemplary execution circuitry 1240 for executing the fractional reciprocal instruction y=1/x according to the above specifications. The execution circuitry in FIG. 15 may include components from the DSP architecture of FIG. 14 and/or may use different execution circuitry. In one embodiment, the input value X comprises a doubleword value (32-bits) in which bits b30 and b29 are used to index a coefficient table as illustrated. Each row in the coefficient table includes a different set of coefficients $c3_n$, $c2_n$, $c1_n$, and $c0_n$, one set of which is selected based on the values of b30 and b29. In one embodiment, a permute instruction such as VPERMILPS is executed to read the coefficients from the row of the coefficient table identified by the b30 and b29 values. For example, based on a specified control value, the VPERMILPS instruction may retrieve different coefficients from different register or memory locations.

In one embodiment, the multipliers 1405 then read the coefficients from one of the source registers 1401-1402 (via input multiplexer 1403) and multiply the packed values as indicated in FIG. 15. For example, in the illustrated implementation, $c3_2$ is multiplied by $R^3$, $c2_2$ is multiplied by $R^2$, and $c1_2$ is multiplied by R. The resulting products $c1_2*R$, $c2_2*R^2$, $c3_2*R^3$ and $c0_2$ are added by adder networks 1410-1411 to generate the result: $c0_2+c1_2*R+c2_2*R^2+c3_2*R^3$.

In one embodiment, Newton-Raphson logic/circuitry 1510 applies Newton-Raphson approximation techniques to roughly double the accuracy of the result. This may be accomplished by computing the relative error for the starting approximation, and then applying a refinement step to the approximation. However, the underlying principles of the invention do not require Newton-Raphson techniques. In one embodiment, for out-of-range inputs (e.g., x<0.5), the output is 0xFFFFFFFF.

In one embodiment, the word reciprocal operation is implemented in a similar manner, but with word values rather than doubleword values. The overall computation is again y=1/x where the input x is in unsigned Q0.16 format and thus scaled by 216. The x range is in [0.5, 1] or [0x8000,0xFFFF] and the result y is uses an unsigned Q1.15 format and thus scaled by 215. The y range is in [1,2] or [0x8000,0xFFFF].

In the word implementation, the coefficient table 1505 is an 8-entry table and the three leading bits of the input (i.e., bits 14, 13, and 12 in one embodiment) are used as a table index to retrieve coefficients c3n, c2n, c1n, and c0n from 8-entry tables (where n is in the range [0, 7]). The remaining input bits [11:0] for the fraction R are used as the argument to the polynomial: $c3*R3+c2*R2+c1*R+c0$. The result of this polynomial evaluation is the instruction output (for in-range inputs). For out-of-range inputs (e.g., x<0.5), the output is 0xFFFF.

Like the doubleword reciprocal instruction described above, the multipliers 1405 multiply input values (R) by coefficients and the results are added/subtracted by adder networks 1410-1411 (as shown in the code example below).

As with the doubleword instruction, Newton-Raphson logic/circuitry 1510 may apply Newton-Raphson estimation techniques to the result to roughly double the accuracy. In one embodiment, this is accomplished by computing the relative error for the starting approximation, and then applying a refinement step to the approximation. However, the underlying principles of the invention do not require Newton-Raphson techniques.

Figure 16:
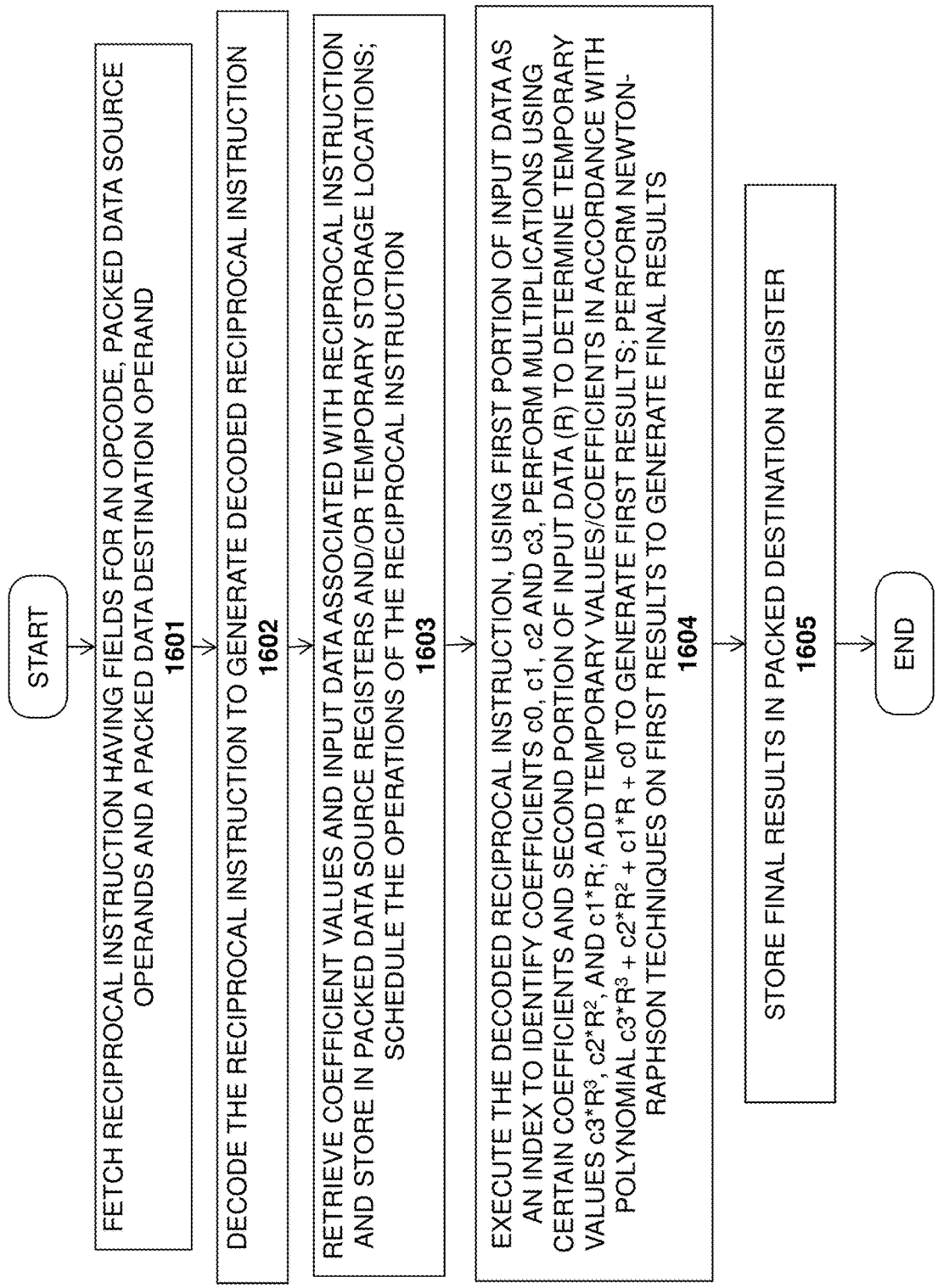
FIG. 16 illustrates a method for processing fractional reciprocal operations in accordance with one embodiment of the invention.

A method in accordance with one embodiment of the invention is illustrated in FIG. 16. The method may be implemented within the context of the processor and system architectures described above but is not limited to any particular system architecture.

At 1601, a reciprocal instruction is fetched having fields for an opcode, packed data source operands, and a packed data destination operand. At 1602 the reciprocal instruction is decoded to generate a decoded reciprocal instruction (e.g., into a plurality of microoperations which perform the individual operations described herein).

At 1603, coefficient values needed to perform the reciprocal operation are retrieved (e.g., from cache/memory) and stored in temporary registers or other storage locations. In addition, the input data is retrieved and stored in a source register (e.g., SRC 1401). As mentioned, the doubleword reciprocal instruction determines a reciprocal using doubleword values and the word reciprocal instruction determines a reciprocal using word values. Accordingly, the input data may be stored in the first source register as packed doubleword (32-bit) or packed word (16-bit) values, depending on the implementation. As mentioned, in one embodiment, the source registers are 128-bit packed data registers. The operations of the reciprocal instructions are scheduled. For example, microoperations into which the instruction is decoded may be queued for execution on a plurality of different functional units of the execution circuitry.

At 1604 the first decoded instruction is executed, using a first portion of the input data as an index value for identifying the coefficients to be used from the coefficient table. In one embodiment, the coefficient table is spread across a plurality of temporary storage locations. In an alternate embodiment, it may be stored in one of the source registers shown in FIG. 14. Regardless of where it is stored, a permute instruction is executed to perform the lookup operation, using the first portion of the input data as the index value (as described in detail below). In one embodiment, the first portion of the input data comprises bits 29 and 30 for a doubleword value and the first portion of the input data comprises bits 12, 13, and 14 for a word value. Thus, in the doubleword implementation, bits 29-30 are used to index one of four entries in the coefficient table and the word implementation bits 12-14 are used to index one of eight entries in the coefficient table.

Once the coefficients are identified, multiplications are performed on the second portion of the input data (R) and/or the coefficients to determine the temporary values c3*R3, c2*R2, and c1*R. The temporary values and coefficients are then added in accordance with the polynomial c3*R3+c2*R2+c1*R+c0 to generate first results. If Newton-Raphson techniques are used, then these are applied to the first results to generate final results. At 1605 the final results are stored in the packed destination register.

2. Exemplary Code Sequence for a Doubleword Reciprocal Operation a. Reciprocal Code Sequence In one embodiment, this architecture performs the following sequence of operations when executing a fractional reciprocal instruction on a doubleword input:

```
unsigned RMASK[ ] = { 0x1fffffff, 0x1fffffff, 0x1fffffff, 0x1fffffff };
// c3*2^31
unsigned_c3[ ] =
{ 0xA2D2ED1E, 0x488414BD, 0x250AB12B, 0x14D9F815 };
// c2*2^31
unsigned_c2[ ] =
{ 0xF31A0690, 0x7E7D71F9, 0x49E7BA04, 0x2ED42A03 };
// c1*2^31
unsigned_c1[ ] =
{ 0xFF661F9F, 0xA39FA3BB, 0x71AF5BD0, 0x538BFD49 };
// c0*2^31
unsigned_c0[ ] =
{ 0xFFFEDDA3, 0xCCCC631A, 0xAAAA7D02, 0x92490E4E };
// (1 + small_correction)*2^63
unsigned ONE[ ] = { 0xf0000000, 0x80000000, 0xf0000000, 0x80000000
};
// used to negate mask
unsigned NEG_MASK[ ] = { 0xffffffff, 0xffffffff, 0xffffffff, 0xffffffff };
//input data
vmovdqa ftmp0, xmm2/m128
// reduced argument R
vandps ftmp6, ftmp0, XMMWORD PTR [RMASK]
// adjust the scale factor
vpaddd ftmp6, ftmp6, ftmp6
// index: leading two fractional bits
vpsrld ftmp1, ftmp0, 29
//vmovd eax, ftmp0
//sar eax, 31
//not eax
// get coefficients, sc 2^31
vmovdqa ftmp5, XMMWORD PTR [_c3]
vmovdqa ftmp3, XMMWORD PTR [_c1]
// equivalent to table lookups
vpermilps ftmp5, ftmp5, ftmp1       //c3
vpermilps ftmp3, ftmp3, ftmp1       // c1
// c3*R*2^(32+31)
vpmuludq ftmp4, ftmp5, ftmp6
vmovdqa XMMWORD PTR [temp1], ftmp6
VPMULUDHHQ ftmp5, ftmp5, ftmp6
// Blend instructions to combine results from two MUL instructions into
// one SIMD register (two 32x32->64-bit MUL instructions are used for
// each 4-way SIMD // multiply step)
// c3*R*2^31
vpsrlq ftmp4, ftmp4, 32
vpblendw ftmp5, ftmp5, ftmp4, 0x33
// c1*R*2^(32+31)
vpmuludq ftmp2, ftmp3, ftmp6
VPMULUDHHQ ftmp3, ftmp3, ftmp6
// c1*R*2^31
vpsrlq ftmp2, ftmp2, 32
vpblendw ftmp3, ftmp3, ftmp2, 0x33
// R^2 * 2^64
vpmuludq ftmp7, ftmp6, ftmp6
VPMULUDHHQ ftmp6, ftmp6, ftmp6
// R^2*2^32
vpsrlq ftmp7, ftmp7, 32
vpblendw ftmp6, ftmp6, ftmp7, 0x33
// table lookups
vmovdqa ftmp4, XMMWORD PTR [_c2]
vmovdqa ftmp2, XMMWORD PTR [_c0]
vpermilps ftmp4, ftmp4, ftmp1 //c2
vpermilps ftmp2, ftmp2, ftmp1 //c0
// (c2-c3*R) * 2^31
vpsubd ftmp4, ftmp4, ftmp5
// (c0-c1 *R)*2^31
vpsubd ftmp2, ftmp2, ftmp3
// (c2-c3*R)*R^2 * 2^63
vpmuludq ftmp7, ftmp6, ftmp4
VPMULUDHHQ ftmp6, ftmp6, ftmp4
// (c2-c3*R)*R^2 * 2^31
vpsrlq ftmp7, ftmp7, 32
vpblendw ftmp6, ftmp6, ftmp7, 0x33
// (c0-c1*R)*2^31 + (c2-c3*R)*R^2 * 2^31
vpaddd ftmp6, ftmp6, ftmp2
// starting approximation is now in ftmp6
vmovdqa ftmp4, XMMWORD PTR [ONE]
vmovdqa ftmp2, XMMWORD PTR [ONE]
// x*rcp*2^63
vpmuludq ftmp1, ftmp0, ftmp6
VPMULUDHHQ ftmp5, ftmp0, ftmp6
// eps*2^63=(1-x*rcp)*2^63
```

-continued

```
vpsubq ftmp4, ftmp4, ftmp1
vpsubq ftmp2, ftmp2, ftmp5
// 64-bit relative error term is in (ftmp4, ftmp2)
// prepare fixup mask
vpsrad ftmp0, ftmp0, 32
vpxor ftmp0, ftmp0, XMMWORD PTR [NEG_MASK]
// ftmp0=0 for in-range inputs, 0xFFFFFFFF otherwise
//****** Version 1: Slightly faster, accuracy 1.9 ulp
// eps*2^32
vpsrlq ftmp4, ftmp4, 31
vpsllq ftmp2, ftmp2, 1
vpblendw ftmp4, ftmp2, ftmp4, 0x33
// Get sign(eps)
vpsrad ftmp3, ftmp4, 31
// This is a correction term needed since eps is signed, but unsigned MUL
//ops are used
vpandn ftmp3, ftmp3, ftmp6
// rcp*eps*2^63
vpmuludq ftmp2, ftmp6, ftmp4
VPMULUDHHQ ftmp6, ftmp6, ftmp4
// rcp*eps*2^31
vpsrlq ftmp2, ftmp2, 32
vpblendw ftmp6, ftmp6, ftmp2, 0x33
// result
vpaddd ftmp6, ftmp6, ftmp3
// fixup for out-of-range inputs (ftmp0=0xFFFFFFFF if out-of-range)
vpor xmm1, ftmp0, ftmp6
``` b. Analysis of Reciprocal Code Sequence

In the above code, each of the four possible values of the four coefficients c0, c1, c2, and c3 are specified. For example, the four possible values for c3 are 0xA2D2ED1E, 0x488414BD, 0x250AB12B, and 0x14D9F815. In addition, the variables RMASK and NEG_MASK are set (i.e., initialized to 0xffffffff) as is the variable ONE (initialized to 0x80000000f0000000).

the "fmtpn" variables in the code identify different temporary storage locations. For example, the initial instruction vmovdqa ftmp0, xmm2/m128 moves the input value X from the xmm2 register (or 128 bit memory location) to the temporary storage location ftmp0.

The instruction Vector AND instruction vandps then performs a bitwise AND of the source value X stored in fmtp0 and the RMASK value to reduce the source value to R, in accordance with the requirements of the reciprocal calculation. The resulting value is stored in ftmp6. The vector AND instruction vpanddd is then executed with both sources and the destination set to ftmp6 to adjust the scale factor for the reciprocal.

The shift packed data right instruction vpsrld is then executed to isolate the two leading bits of the fractional value from ftmp0. In particular, the value is right-shifted by 29, thereby positioning the two index bits (b29 and b30 as shown in FIG. 15) in the least significant bit positions of the temporary storage ftmp1.

The following instruction sequence moves coefficient data for c3 and c1, respectively, to ftmp5 and ftmp3:

```
vmovdqa ftmp5, XMMWORD PTR [_c3]
vmovdqa ftmp3, XMMWORD PTR [_c1]
```

The vpermilps permute instruction then uses the index value in ftmp1 (comprising b29 and b30 or the input value) to select particular c3 and c1 packed data values from ftmp5 and ftmp3, respectively (which is equivalent to a table lookup using these index values):

```
vpermilps ftmp5, ftmp5, ftmp1    //c3
vpermilps ftmp3, ftmp3, ftmp1    // c1
```

The multiplication operation $(c3*2^{31})*(R*2^{32})$ is implemented by the following set of instructions:

```
vpmuludq ftmp4, ftmp5, ftmp6
vmovdqa XMMWORD PTR [temp1], ftmp6
vpmuludhhq ftmp5, ftmp5, ftmp6
```

In one embodiment, blend instructions may then be used to combine results from these two multiplications into one SIMD register (two 32×32->64-bit MUL instructions are used for each 4-way SIMD multiply step). In particular, the operation $c3*R*2^{31}$ is implemented by the shift right instruction vpsrlq which shifts the 64 bit product in ftmp4 by 32 (align the relevant 32 bits), followed by the blend instruction, vpblendw, which combines relevant word data elements from ftmp4 and ftmp5 into ftmp5:

```
vpsrlq ftmp4, ftmp4, 32
vpblendw ftmp5, ftmp5, ftmp4, 0x33
```

The value $c1*R*2^{(32+31)}$ is determined with dual multiply instructions which multiply different components of c1 stored in ftmp3 by components of the source value stored in ftmp6:

```
vpmuludq ftmp2, ftmp3, ftmp6
vpmuludhhq ftmp3, ftmp3, ftmp6
```

The value $c1*R*2^{31}$ is then determined using shift right followed by blend, as discussed above for c3:

```
vpsrlq ftmp2, ftmp2, 32
vpblendw ftmp3, ftmp3, ftmp2, 0x33
```

The value $R2*2^{64}$ is determined using dual multiplication instructions as discussed above, using different components of the source data in ftmp6:

```
vpmuludq ftmp7, ftmp6, ftmp6
VPMULUDHHQ ftmp6, ftmp6, ftmp6
```

The value $R^2*2^{32}$ is then determined using shift right and blend instructions as discussed above:

```
vpsrlq ftmp7, ftmp7, 32
vpblendw ftmp6, ftmp6, ftmp7, 0x33
```

In one embodiment, the following instruction sequence moves coefficient data from c2 and c0 into ftmp4 and ftmp2, respectively, and then uses permute instructions, vpermilps, to perform table lookups for c2 and c0, respectively (as discussed above for c3 and c1):

```
vmovdqa ftmp4, XMMWORD PTR [_c2]
vmovdqa ftmp2, XMMWORD PTR [_c0]
```

```
vpermilps ftmp4, ftmp4, ftmp1  //c2
vpermilps ftmp2, ftmp2, ftmp1  //c0
```

The value (c2−c3*R)*2³¹ is determined with subtract instruction vpsubd ftmp4, ftmp4, ftmp5 and the value (c0−c1*R)*2³¹ is determined with subtract instruction vpsubd ftmp2, ftmp2, ftmp3.

In one embodiment, the value (c2−c3*R)*R2*2⁶³ is then determined via dual multiplication operations vpmuludq ftmp7, ftmp6, ftmp4 and vpmuludhhq ftmp6, ftmp6, ftmp4 and the value (c2−c3*R)*R2*2³¹ by shift right and blend operations vpsrlq ftmp7, ftmp7, 32 and vpblendw ftmp6, ftmp6, ftmp7, 0×33. The value (c0−c1*R)*2³¹+(c2−c3*R)*R2*2³¹ is determined with addition instruction vpaddd ftmp6, ftmp6, ftmp2.

At this stage, the starting approximation is stored in ftmp6:

```
vmovdqa ftmp4, XMMWORD PTR [ONE]
vmovdqa ftmp2, XMMWORD PTR [ONE]
```

The value x*rcp*2⁶³ is determined through dual multiplication instructions, vpmuludq ftmp1, ftmp0, ftmp6 and vpmuludhhq ftmp5, ftmp0, ftmp6, and the value eps*2⁶³=(1−x*rcp)*2⁶³ is determined via subtract instructions vpsubq ftmp4, ftmp4, ftmp1 and vpsubq ftmp2, ftmp2, ftmp5.

In this example, the 64-bit relative error term is in (ftmp4, ftmp2). In one embodiment, a fixup mask is prepared as follows:

```
vpsrad ftmp0, ftmp0, 32
vpxor ftmp0, ftmp0, XMMWORD PTR [NEG_MASK]
// ftmp0=0 for in-range inputs, 0xFFFFFFFF otherwise
```

The following instructions are used to improve accuracy for eps*2³² (e.g., as part of the Newton-Raphson techniques mentioned above). The following two shift instructions shift the values in ftmp4 and ftmp2 to the right and left, respectively, by the amount specified (31 and 1, respectively):

```
vpsrlq ftmp4, ftmp4, 31
vpsllq ftmp2, ftmp2, 1
```

The blend instruction, vpblendw, then blends selected data elements from ftmp4 and ftmp2 and stores them in ftmp4:
vpblendw ftmp4, ftmp2, ftmp4, 0×33
The vpsrad instruction then determines the sign of the value in ftmp4 (eps) using vpsrad ftmp3, ftmp4, 31.

The following correction term is then used since eps is signed, but unsigned MUL ops are used:

vpandn ftmp3, ftmp3, ftmp6
In particular, the AND NOT instruction is used using values from ftmp6 and ftmp3 and stores the results in ftmp3.

The following two multiplication instructions are used to determine the value rcp*eps*2⁶³, multiplying selected elements from ftmp4 and ftmp6:

```
vpmuludq ftmp2, ftmp6, ftmp4
vpmuludhhq ftmp6, ftmp6, ftmp4
```

The value rcp*eps*2³¹ is then determined by executing shift right and blend instructions:

```
vpsrlq ftmp2, ftmp2, 32
vpblendw ftmp6, ftmp6, ftmp2, 0x33
```

The final result is then determined by adding the elements from ftmp3 with ftmp6 and storing the results in ftmp6:
vpaddd ftmp6, ftmp6, ftmp3
The ftmp6 result may be ORed with ftmp to fix out-of-range inputs (i.e., ftmp0=0xFFFFFFFF if out-of-range):
vpor xmm1, ftmp0, ftmp6

3. Exemplary Code Sequence for a Word Reciprocal Operation a. Reciprocal Code Sequence As mentioned, the overall computation is y=1/x where the input x is in unsigned Q0.16 format and thus scaled 2¹⁶. The x range is in [0.5, 1] or [0x8000,0xFFFF] and the result y is uses an unsigned Q1.15 format and thus scaled by 2¹⁵. The y range is in [1,2] or [0x8000,0xFFFF].

The coefficient table 1505 is an 8-entry table and the three leading bits of the input (i.e., bits 14, 13, and 12 in one embodiment) are used as a table index to retrieve coefficients c3n, c2n, c1n, and c0n from 8-entry tables (where n is in the range [0, 7]). The remaining input bits [11:0] for the fraction R are used as the argument to the polynomial: c3*R3+c2*R2+c1*R+c0. The result of this polynomial evaluation is the instruction output (for in-range inputs). For out-of-range inputs (e.g., x<0.5), the output is 0xFFFF.

```
unsigned short RMASK[ ] =
   { 0x0fff, 0x0fff, 0x0fff, 0x0fff, 0x0fff, 0x0fff, 0x0fff, 0x0fff };
unsigned short ONEMASK[ ] =
   { 0xffff, 0xffff, 0xffff, 0xffff, 0xffff, 0xffff, 0xffff, 0xffff };
unsigned short LEADBIT[ ] =
   { 0x8000, 0x8000, 0x8000, 0x8000, 0x8000, 0x8000, 0x8000,
     0x8000 };
// c3*2¹⁵
   unsigned short _c3[ ] =
   { 0xC9EC, 0x8146, 0x5690, 0x3C20, 0x2B0E, 0x1FA2, 0x17C3,
     0x1232 };
// c2*2¹⁵
   unsigned short _c2[ ] =
   { 0xFC08, 0xB18A, 0x81B6, 0x619E, 0x4B4A, 0x3B47, 0x2F80,
     0x26A5 };
// c1*2¹⁵
   unsigned short _c1[ ] =
   { 0xFFE7, 0xCA38, 0xA3CF, 0x8762, 0x71C4, 0x60F0, 0x5396,
     0x48D0 };
// c0*2¹⁵
   unsigned short _c0[ ] =
   { 0xFFFF, 0xC71C, 0x999a, 0x745D, 0x5555, 0x3B14, 0x2492,
     0x1111 };
   unsigned short CORR[ ] =
   { 0x18, 0x18, 0x18, 0x18, 0x18, 0x18, 0x18, 0x18 };
   vmovdqa ftmp0, xmm2/m128
// ftmp1=table index (input bits 14,13,12)
   vpsrlw ftmp1, ftmp0, 12
// leading bit mask (0..0 for x<0.5, 1..1 for x>=0.5)
   vpsraw ftmp6, ftmp0, 15
// reduced argument (input bits 11, 10, ..., 0)
   vpand ftmp0, ftmp0, XMMWORD PTR [RMASK]
// R*2^(16+3)
   vpsllw ftmp0, ftmp0, 4
// get coefficients, sc 2¹⁵
   vmovdqa ftmp5, XMMWORD PTR [_c3]
   vmovdqa ftmp4, XMMWORD PTR [_c2]
```

-continued

```
        vmovdqa ftmp3, XMMWORD PTR [__c1]
        vmovdqa ftmp2, XMMWORD PTR [__c0]
// prepare mask for out-of-range inputs
// ftmp6 = 0xFFFF if input is out-of-range, 0x8000 otherwise
        vpxor ftmp6, ftmp6, XMMWORD PTR [ONEMASK]
        vpor ftmp6, ftmp6, XMMWORD PTR [LEADBIT]
// equivalent to table lookups (VPERMW works on 128 bits)
        vpermw ftmp5, ftmp1, ftmp5     // c3
        vpermw ftmp3, ftmp1, ftmp3     // c2
        vpermw ftmp4, ftmp1, ftmp4     // c1
        vpermw ftmp2, ftmp1, ftmp2     // c0
// c3*R*2^15
        vpmulhuw ftmp5, ftmp5, ftmp0
// c1*R*2^16
        vpmulhuw ftmp3, ftmp3, ftmp0
// R^2*2^(16+6)
        vpmulhuw ftmp0, ftmp0, ftmp0
// Shift instructions are used to adjust the scaling factors of computation
terms
// Terms must have the same scaling factors when they are added or
subtracted
// (c2-c3*R)*2^15
        vpsrlw ftmp5, ftmp5, 3
        vpsubw ftmp4, ftmp4, ftmp5
// (c0-c1*R)*2^16
        vpsrlw ftmp3, ftmp3, 2
        vpsubw ftmp2, ftmp2, ftmp3
// (c2-c3*R)*R^2*2^(15+6)
        vpmulhuw ftmp0, ftmp0, ftmp4
// optional step: add correction for slightly better accuracy
        vmovdqa ftmp7, XMMWORD PTR [CORR]
        vpaddw ftmp0, ftmp0, ftmp7
// result
        vpsrlw ftmp0, ftmp0, 5
        vpaddw ftmp0, ftmp0, ftmp2
// computation result (leading bit is not set)
        vpsrlw ftmp0, ftmp0, 1
// set leading bit of result, and also set out-of-range output to 0xFFFF
        vpor xmm1, ftmp0, ftmp6
``` b. Analysis of Code Sequence

It can be seen from the above code that many of the same techniques used for the doubleword instruction are used for the reciprocal instruction. The overall computation is y=1/x where the input x is in unsigned Q0.16 format and thus scaled 216. The x range is in [0.5, 1] or [0x8000,0xFFFF] and the result y is uses an unsigned Q1.15 format and thus scaled by 215. They range is in [1,2] or [0x8000,0xFFFF].

In the word implementation, the coefficient table is an 8-entry table and the three leading bits of the input (i.e., bits 14, 13, and 12 in one embodiment) are used as a table index to retrieve coefficients $c3n$, $c2n$, $c1n$, and $c0n$ from 8-entry tables (where n is in the range [0, 7]). Consequently, the code specifies eight different values for $c3n$, $c2n$, $c1n$, and $c0n$. For example, the values 0xC9EC, 0x8146, 0x5690, 0x3C20, 0x2B0E, 0x1FA2, 0x17C3, and 0x1232 are specified for c3. The remaining input bits [11:0] for the fraction R are used as the argument to the polynomial: $c3*R^3+c2*R^2+c1*R+c0$. The result of this polynomial evaluation is the instruction output for in-range inputs. For out-of-range inputs (e.g., x<0.5), the output is 0xFFFF.

B. Embodiments for Performing Reciprocal Square Root Operations on Packed Data Elements One embodiment of the invention includes a first instruction for performing a reciprocal square root on an unsigned doubleword and a second instruction for performing a reciprocal square root on an unsigned word. The doubleword values may be stored as packed 32-bit data elements and the doubleword values may be stored as packed 16-bit data elements within the source and destination registers described herein.

One embodiment of the first instruction is represented as VPRSQRTUFD xmm1, xmm2/m128, which takes the reciprocal square root of a doubleword value stored in xmm2/m128 and stores the reciprocal in xmm1. One embodiment of the second instruction is represented as VPRSQRTUFW xmm1, xmm2/m128, where xmm2/m128 is a source register or memory location storing an input word value on which a reciprocal square root is to be calculated and xmm1 is a destination register to store the reciprocal result.

These instructions may be executed on the architecture described above and illustrated in FIG. 14. As previously described when executing a DSP instruction, one or more packed word, doubleword or quadword values are stored in registers SRC 1401 and/or SRC 1402. A set of multipliers 1405 multiply selected packed data elements in SRC 1401 with selected packed data elements in SRC2. Different data element sizes and different combinations of packed data elements may be selected for multiplications based on the particular DSP instruction being executed. Adder networks 1410-1411 may then add/subtract the resulting products of the multiplications in different combinations in accordance with the instruction.

Depending on the instruction, accumulators 1420-1421 may combine selected results generated by the multipliers 1405 and/or adder networks 1410-1411 with accumulated results in the SRC/DEST register 1440. Saturation units 1440-1441 generate saturated data elements from the accumulated results (again, depending on the instruction), and output mux 1450 forwards the final results to the SRC/DEST register 1460.

Various other operations may be performed in accordance with the instruction being executed such as shifting left/right, extracting, loading, storing, permuting, zero-extending, sign extending, rounding, and performing bitwise operations (e.g., AND, OR, NOT AND, etc) on packed data elements, to name a few. In addition, products generated by the multipliers 1405 and results generated by adder networks 1410-1411 may be stored in temporary registers or memory locations which are not illustrated. Some of these temporary storage locations are referred to below using FTMPx designations (where x is a whole number identifying a particular temporary storage region).

1. Exemplary Doubleword Reciprocal Square Root Operations

In one embodiment, the value y=1/sqrt(x) is determined where input x is an unsigned Q0.32 value, which is scaled by 232. The range of x is in [0.25, 1] or [0x40000000, 0xFFFFFFFF] and the result y is in an unsigned Q1.31 format, which is scaled by 231. The range of y is in [1,2] or [0x80000000,0xFFFFFFFF]. In one embodiment, the maximum absolute error is 1.26 ulp and may be further improved as described herein with a ~2 cycle penalty. The reciprocal square root may be approximated to almost 7.65 bits (linear interpolation). As with the reciprocal instructions described above, a permute instruction may be used to retrieve 16-bit coefficients from tables (e.g., VPERMW). The relative error is computed, the a polynomial of degree 3 is applied.

In one embodiment, the input, x, is "normalized" to [0.5, 1] and bit 31 is set to 0 if the initial input was x<0.5. Then the leading bits of the "normalized input" (bits 31, 30, 29) are used as a table index to retrieve coefficients c0, c1 from an 8-entry table. The remaining input bits (R=bits 28, 27, . . . , 0) are used as the argument to c0+c1*R which is a starting approximation for reciprocal square root (RS) and is good to ~7.65 bits. After the relative error, eps, is computed, the final output is evaluated as RS+RS*eps*(pc1+pc2*eps+pc3*eps2) where pc1, pc2, and pc3 are constant coefficients.

Figure 17:
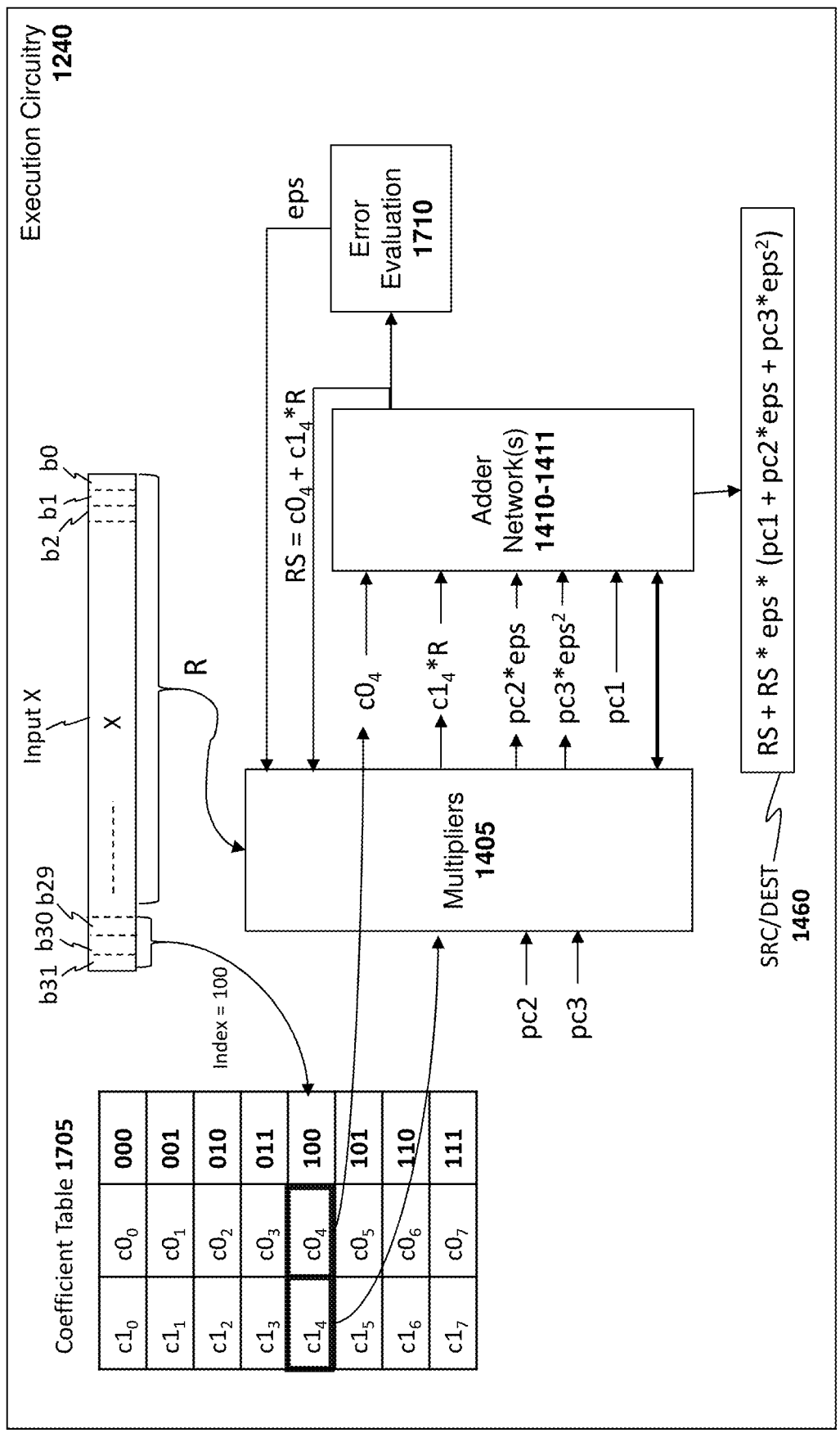
FIG. 17 illustrates one example of an embodiment for processing fractional reciprocal instructions.

FIG. 17 illustrates exemplary execution circuitry 1240 for executing the reciprocal square root instruction y=1/sqrt(x) according to the above specifications. In particular, the input value X comprises the "normalized" input described above which is a doubleword (32-bit) value in which bits b31, b30, and b29 are used to index a coefficient table 1705 as illustrated. Each row in the coefficient table 1705 includes a different pair of coefficients c1n and c0 n, one pair of which is selected from a row based on the values of b31, b30, and b29. In one embodiment, a permute instruction is executed to read the coefficients from the row of the coefficient table identified by the b31, b30, and b29 values. The remaining input bits (R=bits 28, 27, . . . , 0) are used as the argument to c0+c1*R. In particular, multipliers 1405 perform the multiplication c1*R and adder networks 1410-1411 determine c0+c1*R.

Error evaluation circuitry/logic 1710 determines a relative error value, eps. After the relative error is computed, the final output is evaluated as RS+RS*eps*(pc1+pc2*eps+pc3*eps2) where pc1, pc2, and pc3 are constant coefficients and RS=c0+c1*R. Thus, multipliers 1405 perform the operations pc2*eps and pc3*eps2, and adder networks 1410-1411 perform the operation pc1+pc2*eps+pc3*eps2. The multipliers 1405 use this value to perform the operation RS*eps*(pc1+pc2*eps+pc3*eps2) and the adder networks generate the final result: RS+RS*eps*(pc1+pc2*eps+pc3*eps2).

In one embodiment, the word implementation of the reciprocal square root instruction operates in a similar manner as described above. In this embodiment the input x is a word value in an unsigned Q0.16 format, scaled by 216. The value x is in the range of [0.25, 1] or [0x4000,0xFFFF] and the result y is an unsigned Q1.15 value, scaled by 215. The y value is within range [1,2] or [0x8000,0xFFFF]. In one embodiment, the maximum absolute error is 1.23 ulp (which can be further improved with a ~2 cycle penalty). The reciprocal square root is approximated as a polynomial of degree 3, with coefficients extracted from lookup tables as in prior embodiments.

In one embodiment, the input x is "normalized" to [0.5, 1] and bit 15 is set to 0 if the initial input was x<0.5. Then the leading bits of the "normalized input" (bits 15, 14, 13) are used as a table index to retrieve coefficients c3, c2, c1, c0 from 8-entry tables. The remaining input bits (fraction R=bits 11, 10, . . . 0) are used as the argument to the following polynomial: c3*R3+c2*R2+c1*R+c0. The result of this polynomial evaluation is the instruction output (for in-range inputs). For out-of-range inputs (x<0.5), the output is 0xFFFF.

Figure 18:
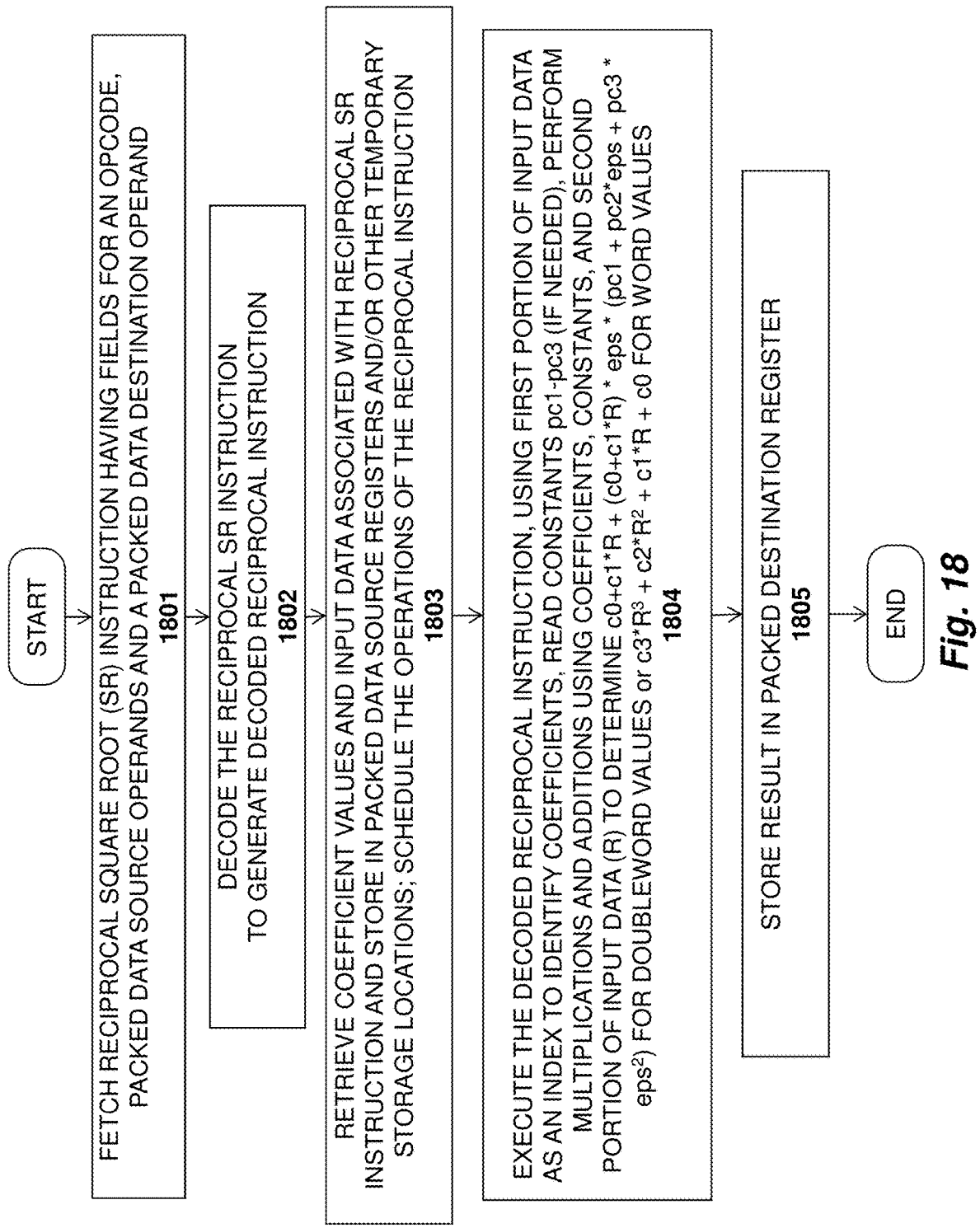
FIG. 18 illustrates a method for processing fractional reciprocal operations in accordance with one embodiment of the invention.

A method in accordance with one embodiment of the invention is illustrated in FIG. 18. The method may be implemented within the context of the processor and system architectures described above but is not limited to any particular system architecture.

At 1801, a reciprocal square root (SR) instruction instruction is fetched having fields for an opcode, packed data source operands, and a packed data destination operand. At 1802 the reciprocal square root instruction is decoded to generate a decoded reciprocal square root instruction (e.g., into a plurality of microoperations which perform the remaining operations of the method).

At 1803, coefficient values needed to perform the reciprocal square root ad input data for the reciprocal square root instruction are retrieved and stored in packed data source registers or temporary storage locations. The operations of the reciprocal instructions are scheduled. For example, the microoperations generated during the decode stage may be queued and scheduled for execution on a plurality of functional units of the execution circuitry.

At 1804, the decoded reciprocal instruction is executed, using a first portion of input data as an index to identify the coefficients. For a doubleword implementation, the index comprises c0 and c1 and for a word implementation the index comprises c0, c1, c2, and c3. In addition, for the doubleword implementation, the constant values pc1, pc2, and pc3 are read from storage. Multiplications and additions are then performed using the coefficients, constants (for doubleword) and the second portion of the input data (R) to determine RS*eps*(pc1+pc2*eps+pc3*eps2) for doubleword or c3*R3+c2*R2+c1*R+c0 for word.

At 1805, the result is stored in a packed destination register.

2. Exemplary Code Sequence for Doubleword Square Root Reciprocal a. Reciprocal Square Root Code Sequence One embodiment performs the following sequence of operations when executing a doubleword reciprocal square root instruction:

```
    unsigned ABSMASK[ ] = { 0x7fffffff, 0x7fffffff, 0x7fffffff,
    0x7fffffff };
    unsigned CMASK[ ] = { 0xffff, 0xffff, 0xffff, 0xffff };
    unsigned ZERO[ ] = { 0x0/*0*0xffffffff*/, 0x200, 0, 0 };
// c1*2^16
    unsigned short __c1[ ] =
    { 0x6bdb, 0x4fad, 0x3df4, 0x31f4, 0x4c44, 0x3857, 0x2bcf,
    0x2352 };
// c0*2^16
    unsigned short __c0[ ] =
    { 0xff67-0x9a, 0xe49e -0x60, 0xd0ca-0x40, 0xc15b-0x2c,
    0xb499-0x6d, 0xa1a8-0x44, 0x93a3-0x30, 0x88b9-0x20 };
// polynomial coefficients
// pc3*2^33
    unsigned __pc3[ ] =
    { 0xA2D62E96, 0xA2D62E96, 0xA2D62E96, 0xA2D62E96 };
// pc2*2^33
    unsigned __pc2[ ] =
    { 0xBFFB70B9, 0xBFFB70B9, 0xBFFB70B9, 0xBFFB70B9 };
// pc1*2^32
    unsigned __pc1[ ] =
    { 0x8000012C, 0x8000012C, 0x8000012C, 0x8000012C };
// constant used for fixup
    unsigned CRANGE[ ] =
    { 0x20000000, 0x20000000, 0x20000000, 0x20000000 };
// (1 + small_correction)*2^62
    unsigned ONE[ ] =
    { 0xe0000000, 0x40000000-1, 0xe0000000, 0x40000000-1 };
        vmovdqa ftmp0, xmm2/m128
        vmovdqa ftmp5, XMMWORD PTR [ABSMASK]
    // lead bit mask
        vpsrad ftmp4, ftmp0, 31
    // input normalization
        vpandn ftmp4, ftmp4, ftmp0
        vpaddd ftmp1, ftmp4, ftmp0
    // clear lead bit for input<0.5
        vpor ftmp5, ftmp0, ftmp5
        vpand ftmp6, ftmp1, ftmp5
    // index
        vpsrld ftmp1, ftmp6, 31-2
    // reduced argument, sc 2^34
        vpslld ftmp6, ftmp6, 3
    // get coefficients, sc 2^16
        vmovdqa ftmp3, XMMWORD PTR [__c1]
        vmovdqa ftmp2, XMMWORD PTR [__c0]
    // coefficient mask
        vmovdqa ftmp7, XMMWORD PTR [CMASK]
    // equivalent to table lookups
        vpermw ftmp3, ftmp1, ftmp3
        vpermw ftmp2, ftmp1, ftmp2
```

```
// c1*R*2^(16+34)
    vpand ftmp3, ftmp3, ftmp7
    vpmuludq ftmp5, ftmp3, ftmp6
    vpmuludhhq ftmp3, ftmp3, ftmp6
// c1*R*2^16
    vpsrlq ftmp5, ftmp5, 34
    vpsrld ftmp3, ftmp3, 2
    vpblendw ftmp3, ftmp3, ftmp5, 0x33
// (c0-c1*R)*2^16
    vpsubw ftmp2, ftmp2, ftmp3
    vpand ftmp6, ftmp2, ftmp7
// ftmp6 is now the starting approximation
// From this point, R is used to denote the starting approximation
// R^2 *2^32
    vpmuludq ftmp2, ftmp6, ftmp6
    vpmuludhhq ftmp3, ftmp6, ftmp6
    vpsllq ftmp3, ftmp3, 32
//vpblendw ftmp3, ftmp3, ftmp2, 0x33
// x*R^2* 2^(30+32)
    vpmuludq ftmp2, ftmp2, ftmp0
    vpmuludhhq ftmp3, ftmp3, ftmp0
// eps is the relative error, initially computed to 64 bits
// eps = (1-x*R^2), sc 2^(30+32)
    vmovdqa ftmp4, XMMWORD PTR [ONE]
    vpsubq ftmp2, ftmp4, ftmp2
    vpsubq ftmp4, ftmp4, ftmp3
// eps*2^(32+6)
    vpsrlq ftmp2, ftmp2, 30-6
    vpsllq ftmp4, ftmp4, 32-24
//vpsrlq ftmp4, ftmp4, 30-6
    vpblendw ftmp4, ftmp4, ftmp2, 0x33
// ftmp4 holds the relative error terms
// polynomial coefficients
    vmovdqa ftmp1, XMMWORD PTR [_pc3]
    vmovdqa ftmp3, XMMWORD PTR [_pc2]
    vmovdqa ftmp5, XMMWORD PTR [_pc1]
// Start evaluating pc1*eps+pc2*eps^2+pc3*eps^3. Note that part of
// the computation is performed on 64 bits (e.g., PADDQ), for
// sufficient accuracy. Shifts are used to adjust scaling factors, and
// blends are used to pack 32-bit data into one SIMD register
// (Shifts by 32 simply move 32-bit elements to the position
required by a MU1 or a blend op.)
// pc3*eps*2^(6+33)
    vpmuludq ftmp2, ftmp1, ftmp4
    vpmuludhhq ftmp1, ftmp1, ftmp4
    vpsrlq ftmp2, ftmp2, 32
    vpblendw ftmp1, ftmp1, ftmp2, 0x33
// (pc2+pc3*eps)*2^33
    vpsrld ftmp1, ftmp1, 6
    vpaddd ftmp1, ftmp1, ftmp3
// eps^2 * 2^(32+12)
    vpmuludq ftmp7, ftmp4, ftmp4
    vpmuludhhq ftmp3, ftmp4, ftmp4
    vpsrlq ftmp7, ftmp7, 32
    vpblendw ftmp3, ftmp3, ftmp7, 0x33
// pc1*eps*2^(32+6+32)
    vpmuludq ftmp2, ftmp5, ftmp4
    vpmuludhhq ftmp5, ftmp5, ftmp4
// prepare fixup mask
    vpsrld ftmp0, ftmp0, 1
    vpsubd ftmp0, ftmp0, XMMWORD PTR [CRANGE]
    vpsrad ftmp0, ftmp0, 31
// ftmp0= 0xFFFFFFFF for out-of-range inputs, 0 otherwise
// eps^2 * (pc2+pc3*eps), sc 2^(32+12+33)
    vpmuludq ftmp7, ftmp1, ftmp3
    vpmuludhhq ftmp1, ftmp1, ftmp3
// P=(pc1*eps)+eps^2 * (pc2+pc3*eps), sc 2^(64+6)
    vpsrlq ftmp7, ftmp7, 7
    vpsrlq ftmp1, ftmp1, 7
    vpaddq ftmp2, ftmp2, ftmp7
    vpaddq ftmp5, ftmp5, ftmp1
// P*2^(32+6)
    vpsrlq ftmp2, ftmp2, 32
    vpblendw ftmp5, ftmp5, ftmp2, 0x33
// R*2^32
    vpslld ftmp6, ftmp6, 16
// R*P, sc 2^(32+32+6 -32)
    vpmuludq ftmp2, ftmp2, ftmp6
    vpmuludhhq ftmp5, ftmp5, ftmp6
    vpsrlq ftmp2, ftmp2, 32
    vpblendw ftmp5, ftmp5, ftmp2, 0x33
// R+R*P, sc 2^32
    vpsrld ftmp5, ftmp5, 6
    vpaddd ftmp6, ftmp6, ftmp5
// OR-in fixup mask for out-of-range inputs
    vpor xmm1, ftmp0, ftmp6
``` b. Analysis of Code Sequence

Thus, the eight potential values for coefficients c0 and c1 are first specified. For example, depending on the index values used to index the lookup table, c1 may be set to 0x6bdb, 0x4fad, 0x3df4, 0x31f4, 0x4c44, 0x3857, 0x2bcf, or 0x235. The polynomial coefficients pc1, pc2 and pc3 are specified and another constant (CRANGE) is specified for fixup operations.

A sequence of multiplication, blend, shift operations are performed using the coefficients and a mask value (ABSMASK) to generate the starting approximation, which is stored in ftmp6 (identified as R in the subsequent code). The relative error terms (e.g., eps) are determined and stored in fmtp4. Evaluation of $pc1*eps+pc2*eps2+pc3*eps3$ is then initiated, using 64 bits to perform the computation (e.g., PADDQ), for sufficient accuracy. Various shifts operations are performed to adjust scaling factors, and blends are used to pack 32-bit data elements into one SIMD register. The value of $(pc1+pc2*eps+pc3*eps2)$ is determined, and a temporary variable P is used to represent $eps*(pc1+pc2*eps+pc3*eps2)$. The final result, $RS+RS*eps*(pc1+pc2*eps+pc3*eps2)$, is initially stored in ftmp6 and is then ORed with a fixup value calculated and stored in ftmp0. The final result stored in the xmm1 register. Note that R=RS in the illustrated code sequence.

3. Exemplary Code Sequence for Word Square Root Reciprocal a. Reciprocal Square Root Code Sequence One embodiment performs the following sequence of operations when executing a doubleword reciprocal square root instruction:

```
unsigned short ABSMASK[ ] =
{ 0x7fff,0x7fff, 0x7fff, 0x7fff, 0x7fff, 0x7fff, 0x7fff, 0x7fff, };
unsigned short CMASK[ ] =
{ 0xc000, 0xc000, 0xc000, 0xc000, 0xc000, 0xc000, 0xc000, 0xc000, };
unsigned short MONE[ ] = { 0xffff,0xffff, 0xffff, 0xffff, 0xffff,0xffff, 0xffff, 0xffff };
unsigned ZERO[ ] = { 0x0/*0*0xffffffff*/, 0x200, 0, 0 };
// c3*2^18
unsigned short _c3[ ] =
{ 0xd706, 0x6a02, 0x3aea, 0x23a4, 0x980b, 0x4af6, 0x29a8, 0x1933 };
// c2*2^17
unsigned short _c2[ ] =
{ 0xb8a5, 0x6b02, 0x4455, 0x2eb2, 0x8290, 0x4baa, 0x3051, 0x2105, };
// c1*2^17
unsigned short _c1[ ] =
{ 0xffa8, 0xb70a, 0x8b49, 0x6e8c, 0xb4c6, 0x816e, 0x627d, 0x4e2b, };
// c0*2^17
unsigned short _c0[ ] =
{ 0xffff, 0x93e4, 0x4417, 0x0612, 0xd413, 0x87a2, 0x4f35, 0x235a, };
// static unsigned short _c0[ ] =
// { 0xffff, 0xe4f9, 0xd106, 0xc185, 0xb505, 0xa1e9, 0x93cd, 0x88d6, };
// (1 + small_correction)*2^62
unsigned ONE[ ] = { 0xe0000000, 0x40000000-1, 0, 0 };
    vmovdqa ftmp0, xmm2/m128
    // lead bit mask
    vpsraw ftmp4, ftmp0, 15
    // use for scalar fixup
    // for SIMD fixup, test range of relative error term (computed later)
```

-continued

```
        //movd eax, ftmp0
        vmovdqa ftmp5, XMMWORD PTR [ABSMASK]
        // input normalization
        vpandn ftmp4, ftmp4, ftmp0
        vpaddw ftmp4, ftmp0, ftmp4
        // clear lead bit for input<0.5
        vpor ftmp5, ftmp5, ftmp0
        vpand ftmp6, ftmp4, ftmp5
        // index
        vpsrlw ftmp1, ftmp6, 15-2
        // reduced argument, sc 2^18
        vpsllw ftmp6, ftmp6, 3
        // get coefficients, sc 2^16
        vmovdqa ftmp7, XMMWORD PTR [_c3]
        vmovdqa ftmp3, XMMWORD PTR [_c1]
        vmovdqa ftmp5, XMMWORD PTR [_c2]
        vmovdqa ftmp0, XMMWORD PTR [_c0]
        // equivalent to table lookups
        vpermw ftmp7, ftmp1, ftmp7  //c3
        vpermw ftmp3, ftmp1, ftmp3  //c2
        vpermw ftmp5, ftmp1, ftmp5  //c1
        vpermw ftmp0, ftmp1, ftmp0  //c0
        // c3*R*2^(2+18)
        vpmulhuw ftmp7, ftmp7, ftmp6
        // c1*R*2^(1+18)
        vpmulhuw ftmp3, ftmp3, ftmp6
        // R^2*2^(2+18)
        vpmulhuw ftmp6, ftmp6, ftmp6
        // prepare leading result bits
// To enhance accuracy, two leading bits of c0 are shifted out (they do not
// fit in the lower 16 bits of c0*2^18, which are stored in the table).
// These leading bits are 11 when x in [0.25,0.5] and 10 for x in [0.5, 1].
They are now set in ftmp1.
        vpsrlw ftmp1, ftmp1, 2
        vpsllw ftmp1, ftmp1, 14
        vpxor ftmp1, ftmp1, XMMWORD PTR [CMASK]
        vmovdqa ftmp2, ftmp0
        // (c2-c3*R)*2^17
        vpsrlw ftmp7, ftmp7, 20-17
        vpsubw ftmp5, ftmp5, ftmp7
        // (c0-c1*R)*2^18
        vpsrlw ftmp3, ftmp3, 19-18
        vpsubw ftmp0, ftmp0, ftmp3
        // (c2-c3*R)*R^2*2^(17+4)
        vpmulhuw ftmp5, ftmp5, ftmp6
        // prepare mask for invalid inputs
        vpsraw ftmp4, ftmp4, 15
        vpandn ftmp4, ftmp4, XMMWORD PTR [MONE]
// ftmp4 = 0xFFFF for out-of-range inputs
        // (c0-c1*R) + (c2-c3*R)*R^2
        vpsrlw ftmp5, ftmp5, 21-18
        vpaddw ftmp0, ftmp0, ftmp5
        // check for borrow-in to ensure that upper bits of ftmp0 are
        // properly set after shift-right
        vpandn ftmp2, ftmp2, ftmp0
        vpsraw ftmp2, ftmp2, 2
        vpand ftmp2, ftmp2, XMMWORD PTR [CMASK]
        vpsrlw ftmp0, ftmp0, 2
        vpor ftmp0, ftmp0, ftmp2
// add leading bits of result, from ftmp1
        vpaddw ftmp0, ftmp0, ftmp1
        // OR-in fixup mask for out-of-range inputs
            vpor xmm1, ftmp0, ftmp4
``` b. Analysis of Code Sequence

Thus, the mask values, ABSMASK and CMASK, and the variables MONE and ZERO are initialized and eight potential values for coefficients c0, c1, c2, and c3 are first specified. For example, depending on the index values used to index the lookup table, c1 may be set to 0xffa8, 0xb70a, 0x8b49, 0x6e8c, 0xb4c6, 0x816e, 0x627d, or 0x4e2b. The polynomial coefficients, pc1, pc2 and pc3 used for the doubleword reciprocal are not used.

A sequence of multiplication, blend, shift operations are performed using the coefficients and mask values, staring with a move operation to transfer the input value from xmm2 to ftmp0. After the coefficients are transferred to temporary storage locations (ftmpn), a sequence of permute operations are performed (vpermw) to perform table lookups to determine the correct set of coefficients to use. As mentioned, bits 15, 14, and 13 are used to perform the table lookup. The remaining input bits (fraction R=bits 11, 10, . . . 0) are used as the argument to the polynomial $c3*R3+c2*R2+c1*R+c0$.

In one implementation, two leading bits of c0 are shifted out to improve accuracy. These do not fit in the lower 16 bits of $c0*2^{18}$ stored in the table. These leading bits are 11 when x is in [0.25, 0.5] and 10 for x in [0.5, 1]. In the example code, they are stored in ftmp1 and subsequently added to the result stored in ftmp0. The result in ftmp0 is then ORed with the fixup mask value from ftmp4 (which is set to 0xFFFF for out-of-range inputs) and the final result, $c3*R3+c2*R2+c1*R+c0$ (for in-range inputs) or 0xFFFF (for out-of-range inputs) is stored in xmm1.In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a decoder to decode an instruction to generate a decoded instruction;
a source register to store at least one packed input data element;
a destination register to store a result data element; and
execution circuitry to execute the decoded instruction, the execution circuitry to use a first portion of the packed input data element as an index to a data structure containing a plurality of sets of coefficients to identify a first set of coefficients from the plurality of sets, and the execution circuitry to generate a reciprocal square root of the packed input data element using a combination of the coefficients and a second portion of the packed input data element and store the reciprocal square root in the destination register as the result data element, wherein combining the coefficients with the second portion of the packed input data element comprises multiplications of the coefficients, the second portion of the packed input data element, and a relative error value.

2. The processor of claim 1 wherein combining the coefficients with the second portion of the packed input data element comprises determining the relative error value based on the second portion of the packed input data element and using the relative error value to estimate the reciprocal square root.

3. The processor of claim 2 wherein using the relative error value comprises determining the value $c0+c1*R+(c0+c1*R)*eps*(pc1+pc2*eps+pc3*eps^2)$, wherein c0 and c1 are the coefficients, R comprises the second portion of the packed input data element, pc1, pc2, and pc3 comprise constant values, and eps comprises the relative error value.

4. The processor of claim 2 wherein the packed input data element comprises a doubleword data element.

5. The processor of claim 1 wherein combining the coefficients with the second portion of the packed input data element comprises evaluating a polynomial function with the coefficients as polynomial coefficients and the second portion of the packed input data element as input to the polynomial function.

6. The processor of claim 5 wherein the polynomial function comprises $c3*R^3+c2*R^2+c1*R+c0$ wherein c0, c1, c2, and c3 are the coefficients and R is the second portion of the packed input data element.

7. The processor of claim 1 wherein the execution circuitry comprises a plurality of multipliers to multiply one or more of the first set of coefficients by the second portion of the packed input data or data values derived from the second portion of the packed input data, the multiplications generating a plurality of temporary products.

8. The processor of claim 7 wherein the execution circuitry further comprises an adder network to add the temporary products to generate a result to be stored as a packed data element in the destination register.

9. The processor of claim 8 wherein the adder network is to also add one or more additional values to the temporary products to generate the result.

10. The processor of claim 9 wherein the one or more additional values comprises at least one of the coefficients.

11. A method comprising:
decoding an instruction;
storing at least one packed input data element in a source register;
executing the decoded instruction, wherein executing comprises using a first portion of a packed input data element of a source register as an index to a data structure containing a plurality of sets of coefficients to identify a first set of coefficients from the plurality of sets; and
generating and storing in a destination register a reciprocal square root of the packed input data element using a combination of the coefficients and a second portion of the packed input data element and store the reciprocal square root in the destination register as a result data element, wherein combining the coefficients with the second portion of the packed input data element comprises multiplications of the coefficients, the second portion of the packed input data elements, and a relative error value.

12. The method of claim 11 wherein combining the coefficients with the second portion of the packed input data element comprises determining the relative error value based on the second portion of the packed input data element and using the relative error value to estimate the reciprocal square root.

13. The method of claim 12 wherein using the relative error value comprises determining the value $c0+c1*R+(c0+c1*R)*eps*(pc1+pc2*eps+pc3*eps^2)$, wherein c0 and c1 are the coefficients, R comprises the second portion of the packed input data element, pc1, pc2, and pc3 comprise constant values, and eps comprises the relative error value.

14. The method of claim 12 wherein the packed input data element comprises a doubleword data element.

15. The method of claim 11 wherein combining the coefficients with the second portion of the packed input data element comprises evaluating a polynomial function with the coefficients as polynomial coefficients and the second portion of the packed input data element as input to the polynomial function.

16. The method of claim 15 wherein the polynomial function comprises $c3*R^3+c2*R^2+c1*R+c0$ wherein c0, c1, c2, and c3 are the coefficients and R is the second portion of the packed input data element.

17. The method of claim 11 wherein generating a reciprocal square root comprises multiplying one or more of the first set of coefficients by the second portion of the packed input data or data values derived from the second portion of the packed input data, the multiplications generating a plurality of temporary products.

18. The method of claim 17 wherein generating a reciprocal square root comprises adding the temporary products to generate a result to be stored as a packed data element in the destination register.

19. The method of claim 18 further comprising:
adding one or more additional values to the temporary products to generate the result.

20. The method of claim 19 wherein the one or more additional values comprises at least one of the coefficients.

21. A non-transitory machine-readable medium having program code stored thereon which, when executed by a machine, causes the machine to perform the operations of:

decoding an instruction to generate a decoded instruction;

storing at least one packed input data element in a source register;

executing the decoded instruction, wherein executing comprises using a first portion of the packed input data element as an index to a data structure containing a plurality of sets of coefficients to identify a first set of coefficients from the plurality of sets; and generating and storing in a destination register a reciprocal square root of the packed input data element using a combination of the coefficients and a second portion of the packed input data element and store the reciprocal square root in the destination register as a result data element, wherein combining the coefficients with the second portion of the packed input data element comprises multiplications of the coefficients, the second portion of the packed input data element, and a relative error value.

22. The non-transitory machine-readable medium of claim 21 wherein combining the coefficients with the second portion of the packed input data element comprises determining the relative error value based on the second portion of the packed input data element and using the relative error value to estimate the reciprocal square root.

23. The non-transitory machine-readable medium of claim 22 wherein using the relative error value comprises determining the value $c0+c1*R+(c0+c1*R)*eps*(pc1+pc2*eps+pc3*eps^2)$ wherein c0 and c1 are the coefficients, R comprises the second portion of the packed input data element, pc1, pc2, and pc3 comprise constant values and eps comprises the relative error value.

24. The non-transitory machine-readable medium of claim 22 wherein the packed input data element comprises a doubleword data element.

25. The non-transitory machine-readable medium of claim 21 wherein combining the coefficients with the second portion of the packed input data element comprises evaluating a polynomial function with the coefficients as polynomial coefficients and the second portion of the packed input data element as input to the polynomial function.

26. The non-transitory machine-readable medium of claim 25 wherein the polynomial function comprises $c3*R^3+c2*R^2+c1*R+c0$ wherein c0, c1, c2, and c3 are the coefficients and R is the second portion of the packed input data element.

27. The non-transitory machine-readable medium of claim 21 wherein generating a reciprocal square root comprises multiplying one or more of the first set of coefficients by the second portion of the packed input data or data values derived from the second portion of the packed input data, the multiplications generating a plurality of temporary products.

28. The non-transitory machine-readable medium of claim 27 wherein generating a reciprocal square root comprises adding the temporary products to generate a result to be stored as a packed data element in the destination register.

29. The non-transitory machine-readable medium of claim 28 further comprising program code to cause the machine to perform the operations of:

adding one or more additional values to the temporary products to generate the result.

30. The non-transitory machine-readable medium of claim 29 wherein the one or more additional values comprises at least one of the coefficients.

* * * * *